United States Patent
Smith et al.

(10) Patent No.: US 11,902,090 B2
(45) Date of Patent: Feb. 13, 2024

(54) DATA PACKAGING PROTOCOLS FOR COMMUNICATIONS BETWEEN IOT DEVICES

(71) Applicant: Intel Corporation, Santa Clara, CA (US)

(72) Inventors: Ned M. Smith, Beaverton, OR (US); Keith Nolan, Mullingar (IE); Mark Kelly, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 17/542,206

(22) Filed: Dec. 3, 2021

(65) Prior Publication Data

US 2022/0200851 A1   Jun. 23, 2022

Related U.S. Application Data

(63) Continuation of application No. 16/466,997, filed as application No. PCT/US2017/068830 on Dec. 28, 2017, now Pat. No. 11,196,623.

(Continued)

(51) Int. Cl.
*H04L 41/0806* (2022.01)
*H04L 67/10* (2022.01)
(Continued)

(52) U.S. Cl.
CPC ...... *H04L 41/0806* (2013.01); *G06F 16/1824* (2019.01); *G06F 16/1834* (2019.01);
(Continued)

(58) Field of Classification Search
CPC . H04L 41/0806; H04L 9/0825; H04L 9/3239; H04L 41/12; H04L 45/20;
(Continued)

(56) References Cited

U.S. PATENT DOCUMENTS

| 6,058,383 | A  | 5/2000 | Narasimhalu et al. |
| 6,917,984 | B1 | 7/2005 | Tan |

(Continued)

FOREIGN PATENT DOCUMENTS

| EP | 2566204 A1 | 3/2013 |
| WO | 0065800 A1 | 11/2000 |

(Continued)

OTHER PUBLICATIONS

International Search Report for related PCT Application PCT/US2017068806 with a completion date of Mar. 14, 2018 and dated Mar. 21, 2018, 3 pages.

(Continued)

*Primary Examiner* — Kiet Tang
(74) *Attorney, Agent, or Firm* — Hanley, Flight & Zimmerman, LLC

(57) ABSTRACT

An Internet of Things (IoT) network includes an IoT device with a communicator to send a communication including egress frame, protocol library builder to determine available protocols, frame analyzer to analyze an ingress frame, and frame builder to build the egress frame from the ingress frame. An IoT network includes an IoT device with network discoverer to identify available parallel communication channels between the IoT device and target device, payload, payload fragmenter/packager to fragment the payload into sub-objects for transmission, and packet communicator to send sub-objects to the target device over parallel communication channels. An IoT network includes a plurality of IoT devices, which each include a communication channel to an upstream device, a network link to another one of the plurality of IoT devices, a hash calculator to identify a neighbor IoT device, and a communicator to send out a message to the neighbor IoT device.

25 Claims, 27 Drawing Sheets

Related U.S. Application Data

(60) Provisional application No. 62/441,070, filed on Dec. 30, 2016.

(51) Int. Cl.

| | | |
|---|---|---|
| *H04L 67/12* | (2022.01) | |
| *H04W 4/70* | (2018.01) | |
| *G06F 16/182* | (2019.01) | |
| *H04L 9/08* | (2006.01) | |
| *H04L 9/32* | (2006.01) | |
| *H04L 45/00* | (2022.01) | |
| *H04L 67/104* | (2022.01) | |
| *H04L 69/18* | (2022.01) | |
| *H04W 4/08* | (2009.01) | |
| *H04W 84/22* | (2009.01) | |
| *H04L 41/12* | (2022.01) | |
| *H04L 69/22* | (2022.01) | |
| *H04L 67/1087* | (2022.01) | |
| *H04W 12/69* | (2021.01) | |
| *H04L 61/4505* | (2022.01) | |
| *H04L 61/5069* | (2022.05) | |
| *H04L 67/562* | (2022.01) | |
| *H04W 84/18* | (2009.01) | |
| *H04L 9/00* | (2022.01) | |

(52) U.S. Cl.
CPC .......... *H04L 9/0825* (2013.01); *H04L 9/3239* (2013.01); *H04L 41/12* (2013.01); *H04L 45/20* (2013.01); *H04L 61/4505* (2022.05); *H04L 61/5069* (2022.05); *H04L 67/10* (2013.01); *H04L 67/104* (2013.01); *H04L 67/1046* (2013.01); *H04L 67/1093* (2013.01); *H04L 67/12* (2013.01); *H04L 67/562* (2022.05); *H04L 69/18* (2013.01); *H04L 69/22* (2013.01); *H04W 4/08* (2013.01); *H04W 4/70* (2018.02); *H04W 12/69* (2021.01); *H04W 84/22* (2013.01); *H04L 9/50* (2022.05); *H04L 2209/56* (2013.01); *H04W 84/18* (2013.01)

(58) Field of Classification Search
CPC . H04L 61/4505; H04L 61/5069; H04L 67/10; H04L 67/104; H04L 67/1046; H04L 67/1093; H04L 67/12; H04L 67/562; H04L 69/18; H04L 69/22; H04L 9/50; H04L 2209/56; H04L 63/123; H04L 41/5054; H04L 41/0816; H04L 41/0886; H04L 41/16; H04L 67/303; H04L 67/04; H04L 1/1864; G06F 16/1824; G06F 16/1834; H04W 4/08; H04W 4/70; H04W 12/69; H04W 84/22; H04W 84/18; H04W 12/106; H04W 12/76
See application file for complete search history.

(56) References Cited

U.S. PATENT DOCUMENTS

| | | | |
|---|---|---|---|
| 8,996,459 B2 | 3/2015 | Arthursson et al. | |
| 11,196,623 B2 | 12/2021 | Smith et al. | |
| 2003/0051045 A1 | 3/2003 | Connor | |
| 2003/0081592 A1* | 5/2003 | Krishnarajah | H04L 69/22 370/352 |
| 2003/0139179 A1* | 7/2003 | Fuchs | H04L 67/04 455/420 |
| 2004/0081203 A1 | 4/2004 | Sodder et al. | |
| 2007/0233881 A1 | 10/2007 | Nochta | |
| 2009/0006638 A1 | 1/2009 | George et al. | |
| 2011/0142045 A1 | 6/2011 | Ait-Ameur et al. | |
| 2012/0002683 A1 | 1/2012 | You et al. | |
| 2012/0042222 A1* | 2/2012 | Cha | H04L 1/1864 714/749 |
| 2012/0210066 A1 | 8/2012 | Joshi et al. | |
| 2015/0149559 A1 | 5/2015 | Phillips et al. | |
| 2015/0156266 A1 | 6/2015 | Gupta | |
| 2015/0170072 A1 | 6/2015 | Grant et al. | |
| 2015/0244690 A1 | 8/2015 | Mossbarger | |
| 2016/0182497 A1 | 6/2016 | Smith | |
| 2016/0191345 A1 | 6/2016 | Despotovic et al. | |
| 2016/0232908 A1 | 8/2016 | Fuchs et al. | |
| 2016/0275461 A1 | 9/2016 | Sprague et al. | |
| 2017/0269970 A1* | 9/2017 | Bequet | H04L 67/10 |
| 2017/0366421 A1* | 12/2017 | Dam | H04L 43/045 |
| 2018/0077057 A1 | 3/2018 | Zaidi et al. | |
| 2019/0349433 A1 | 11/2019 | Smith et al. | |

FOREIGN PATENT DOCUMENTS

| | | | |
|---|---|---|---|
| WO | 2004073281 | A2 | 8/2004 |
| WO | 2009141385 | A2 | 11/2009 |
| WO | 2015126734 | A1 | 8/2015 |
| WO | 2015130752 | A1 | 9/2015 |
| WO | 2017066002 | A1 | 4/2017 |
| WO | 2018125989 | A2 | 7/2018 |
| WO | 2018126029 | A2 | 7/2018 |
| WO | 2018126065 | A1 | 7/2018 |
| WO | 2018126075 | A1 | 7/2018 |
| WO | 2018126076 | A1 | 7/2018 |
| WO | 2018126077 | A1 | 7/2018 |

OTHER PUBLICATIONS

Kim et al; "Increasing Web Server Throughput with Network Interface Data Caching"; Computer Systems Laboratory, Rice University Houston Texas; Operating Systems Review, vol. 36 No. 5; ACM Oct. 2002.

International Search Report for related PCT Application PCT/US2017068830 with a completion dale of Mar. 14, 2018 and dated Mar. 22, 2018, 2 pages.

Ergen et al; "MAC Protocol Engine for Sensor Networks" Global Telecommunications Conference Nov. 2009 GLOBECOM, Piscataway New Jersey. 17 pages.

International Search Report for related PCT Application PCT/US2017/068828 with a completion dale of Mar. 22, 2018 and dated Mar. 29, 2018, 3 pages.

Hardjono et al; "Cloud-Based Commissioning of Constrained Devices using Permissioned Blockchains" Proceedings of ACM IoT Privacy, Trust & Security—IoTPTS 2016 Xi'an, China, May 2016, 8 pages.

International Search Report for related PCT Application PCT/US2017/068743 with a completion dale of Jun. 28, 2018 and dated Jul. 6, 2018, 6 pages.

Hardjono et al; "Anonymous Identities for Permissioned Blockchains" (DRAFT v06C—Jan. 24, 2016—Please Do Not Distribute) 16 pages, retrieved from the internet on May 31, 2019 hllps://pdfs.semanticscholar.org/2ef6/:1571f3d0a9927fbe29363a8038b0d148f881.pdf.

Hardjono et al; "Verifiable Anonymous Identities and Access Control in Permissioned Blockchains" Draft Apr. 17, J016, retrieved from the internet on May 31, 2019 hllps://arxiv.org/pdf/1903.04584.pdf9 pages.

Antonopoulos, Andreas M. "Mastering Bilcoin: Unlocking Digital Cryptocurrencies" Chapter 9, Dec. 20, J014 O'Reilly Publishing. Tokyo Japan.

International Search Report for related PCT Application PCT/US2017068683 with a completion dale of Jul. 1, 2018 and dated Jul. 7, 2018, 7 pages.

International Search Report for related PCT Application PCT/US2017/068832 with a completion dale of Mar. 15, 2018 and dated May 17, 2018, 4 pages.

Fromknecht et al;:"A Decentralized Public Key Infrastructure with Identity Retention" Published in IACR Cryptology ePrint Archive Nov. 2014, 16 pages.

Fromknecht et al; "CertCoin:A NameCoin Based Decentralized Authentication System 6.857 Class Project" May 2014, retrieved

(56) References Cited

OTHER PUBLICATIONS from the Internet on Jun. 3, 2019 https://courses.csail.mil.edu/6.857/2014/files/19-fromknecht-velicann-yakoubov-certcoin.pdf 19 pages.
United States Patent and Trademark Office, "Non-Final Office Action", issued in connection with U.S. Appl. No. 16/466,997, dated Apr. 13, 2021, (25 pages).
United States Patent and Trademark Office, "Notice of Allowance", issued in connection with U.S. Appl. No. 16/466,997, dated Aug. 5, 2021, (8 pages).
International Searching Authority, "Written Opinion of the International Searching Authority", issued in connection with International Patent Application No. PCT/US2017/068830, dated Mar. 22, 2018, 9 pages.
International Searching Authority, "Written Opinion of the International Searching Authority", issued in connection with International Patent Application No. PCT/US2017068828, dated Mar. 29, 2018, 10 pages.
International Searching Authority, "International Preliminary Report on Patentability," issued in connection with International Patent Application No. PCT/US2017/068743, dated Jul. 2, 2019, 9 Pages.
International Searching Authority, "Written Opinion of the International Searching Authority", issued in connection with International Patent Application No. PCT/US2017/068743, dated Jul. 6, 2018, 8 pages.
International Searching Authority, "International Preliminary Report on Patentability," issued in connection with International Patent Application No. PCT/US2017/068683, dated Jul. 2, 2019, 11 pages.
International Searching Authority, "Written Opinion of the International Searching Authority", issued in connection with International Patent Application No. PCT/US2017/068683, dated Jul. 7, 2018, 10 pages.
International Searching Authority, "Written Opinion of the International Searching Authority", issued in connection with International Patent Application No. PCT/US2017/068832, dated May 17, 2018, 10 pages.
International Searching Authority, "Written Opinion of the International Searching Authority", issued in connection with International Patent Application No. PCT/US2017/068806, dated May 21, 2018, 9 pages.

* cited by examiner

200

800

1400

1700

DATA PACKAGING PROTOCOLS FOR COMMUNICATIONS BETWEEN IOT DEVICES

CROSS REFERENCE TO RELATED APPLICATIONS

This patent arises from a continuation of U.S. patent application Ser. No. 16/466,997 (now U.S. Pat. 11,196,623) which was filed on Jun. 5, 2019 (371 (c) date of Jun. 6, 2019), which arises from a national stage application of PCT Application No. PCT/US2017/068830, which was filed on Dec. 28, 2017, which claims the benefit of U.S. Provisional Patent Application No. 62/441,070, which was filed on Dec. 30, 2016. U.S. patent application Ser. No. 16/466,997, PCT Application No. PCT/US2017/068830, and U.S. Provisional Patent Application No. 62/441,070 are hereby incorporated herein by reference in their entireties. Priority to U.S. Patent Application No. 16/466,997, PCT Application No. PCT/US2017/068830, and U.S. Provisional Patent Application No. 62/441,070 is hereby claimed.

TECHNICAL FIELD

The present techniques relate generally to Internet of Things (IoT) devices. More specifically the present techniques relate to devices that can perform remote sensing and actuation functions.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The Internet-of-Things (IoT) is a system in which a large number of computing devices are interconnected to each other and to a communications network (e.g., the Internet) to provide a functionality, such as data acquisition and actuation, at very low levels in networks. Low levels indicate devices that may be located at or near the edges of networks, such as the last devices before the networks end. As used herein, an IoT device may include a device performing a function, such as sensing or control, among others, in communication with other IoT devices and a communications network. The IoT device may include an autonomous device or a semiautonomous device configured to perform one or more functions. Often, IoT devices can be limited in memory, size, or functionality, allowing larger numbers to be deployed for a similar cost to a smaller number of larger devices. However, an IoT device may be a smart phone, laptop, tablet, PC, and/or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home devices, such as water distribution systems, electric power distribution systems, pipeline control systems, plant control systems, light switches, thermostats, locks, cameras, alarms, motion sensors, and the like. The IoT devices may be accessible through a controller, such as computers, servers, and other systems, for example, to control systems or access data. The controller and the IoT devices can be remotely located from one another.

The Internet can be configured to provide communications to a large number of IoT devices. Accordingly, as described herein, a number of innovations for the future Internet are designed to address the need for network layers, from central servers, through gateways, down to edge devices, to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity including a combination of wired and wireless technologies as depicted in FIGS. 1 and 2.

Figure 1:
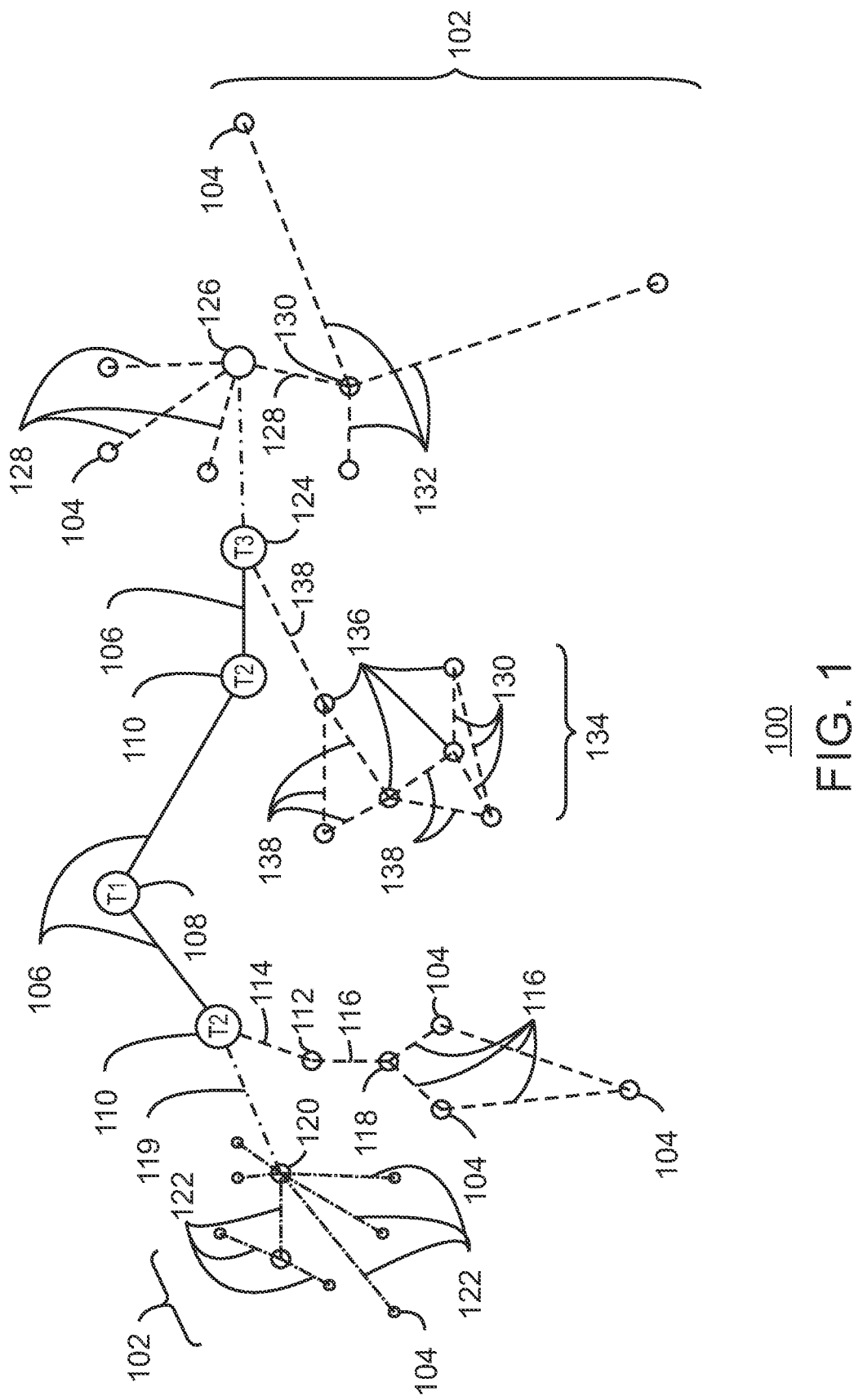
FIG. 1 is a drawing of interconnections that may be present in the Internet in accordance with some embodiments.
Figure 2:
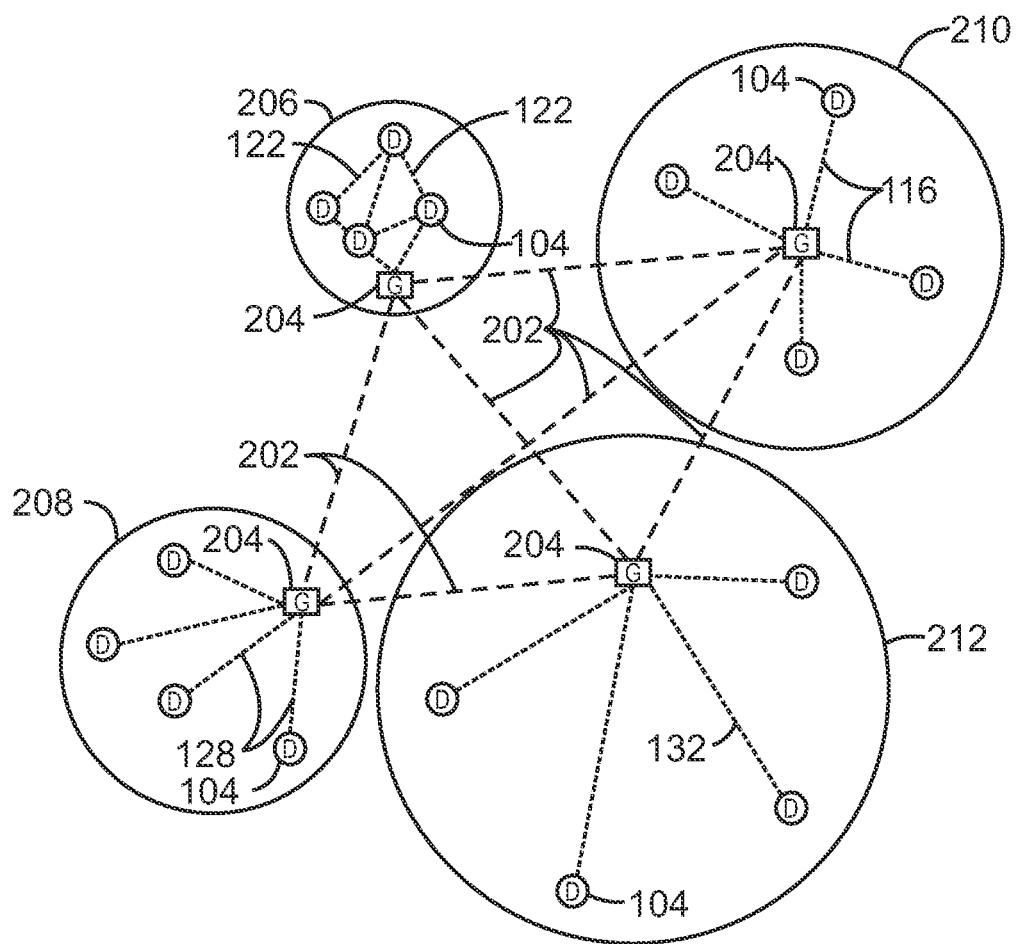
FIG. 2 is a drawing of a network topology for a number of internet-of-things (IoT) networks coupled through backbone links to gateways in accordance with some embodiments.

FIG. 1 is a drawing of interconnections that may be present between the Internet 100 and IoT networks in accordance with some embodiments. The interconnections may couple smaller networks 102, down to the individual IoT device 104, to the backbone 106 of the Internet 100. To simplify the drawing, not every device 104, or other object, is labeled.

In FIG. 1, top-level providers, which may be termed tier 1 ("T1") providers 108, are coupled by the backbone 106 of the Internet to other providers, such as secondary or tier 2 ("T2") providers 110. In some aspects, the backbone 106 can include optical fiber links. In one example, a T2 provider 110 may couple to a tower 112 of an LTE cellular network, for example, by further links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116.

In another example, a high-speed uplink 119 may couple a T2 provider 110 to a gateway 120. A number of IoT devices 104 may communicate with the gateway 120, and with each other through the gateway 120, for example, over Bluetooth low energy (BLE) links 122.

The backbone 106 may couple lower levels of service providers to the Internet, such as tier 3 ("T3") providers 124. A T3 provider 124 may be considered a general Internet service provider (ISP), for example, purchasing access to the backbone 106 from a T2 provider 110 and providing access to a corporate gateway 126 and other customers.

From the corporate gateway 126, a wireless local area network (WLAN) can be used to communicate with IoT devices 104 through Wi-Fi® links 128. A Wi-Fi link 128 may also be used to couple to a low power wide area (LPWA) gateway 130, which can communicate with IoT devices 104 over LPWA links 132, for example, compatible with the LoRaWan specification promulgated by the LoRa alliance.

The T3 provider 124 may also provide access to a mesh network 134 through a coordinator device 136 that communicates with the T3 provider 124 using any number of communications links, such as an LTE cellular link, an LPWA link, or a link 138 based on the IEEE 802.15.4 standard, such as Zigbee®. Other coordinator devices 136 may provide a chain of links that forms one or more cluster tree of linked devices.

In some aspects, one or more IoT devices 104 include the appropriate transceiver for the communications with other devices. Further, one or more IoT devices 104 may include other radio, optical, or acoustic transceivers, as well as wired network interfaces, for communications using additional protocols and frequencies. In some aspects, one or more IoT devices 104 includes components described in regard to FIG. 11.

The technologies and networks may enable the growth of devices and networks. As the technologies grow, the network may be developed for self-management, functional evolution, and/or collaboration, without needing direct human intervention. Thus, the technologies may enable networks to function without centralized controlled systems. The technologies described herein may automate the network management and operation functions beyond current capabilities. Further, the approaches may provide the flexibility to have a centralized control operating without human intervention, a centralized control that is automated, or any combinations thereof.

FIG. 2 is a drawing of a network topology 200 that may be used for a number of internet-of-things (IoT) networks coupled through backbone links 202 to gateways 204 in accordance with some embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet.

Although the topologies in FIG. 2 are hub-and-spoke and the topologies in FIG. 1 are peer-to-peer, it may be observed that these are not in conflict, but that peer-to-peer nodes may behave as hub-and-spoke through gateways. It may also be observed in FIG. 2 that a sub-net topology may have multiple gateways, rendering it a hybrid topology rather than a purely hub-and-spoke topology (or rather than a strictly hub-and-spoke topology).

The network topology 200 may include any number of types of IoT networks, such as a mesh network 206 using Bluetooth Low Energy (BLE) links 122. Other IoT networks that may be present include a WLAN network 208, a cellular network 210, and an LPWA network 212. Each of these IoT networks may provide opportunities for new developments, as described herein.

For example, communications between IoT devices 104, such as over the backbone links 202, may be protected by a decentralized system for authentication, authorization, and accounting (AAA). In a decentralized AAA system, distributed payment, credit, audit, authorization, brokering, arbitration, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, and vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner. This may allow such functionality as a first stage performing a first numerical operation, before passing the result to another stage, the next stage then performing another numerical operation, and passing that result on to another stage. The system may provide the ability to differentiate between assets and resources and the associated management of each. Furthermore, the proper components of infrastructure and resource based trust and service indices may be inserted to improve the data integrity, quality assurance, and deliver a metric of data confidence.

As described herein, the WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
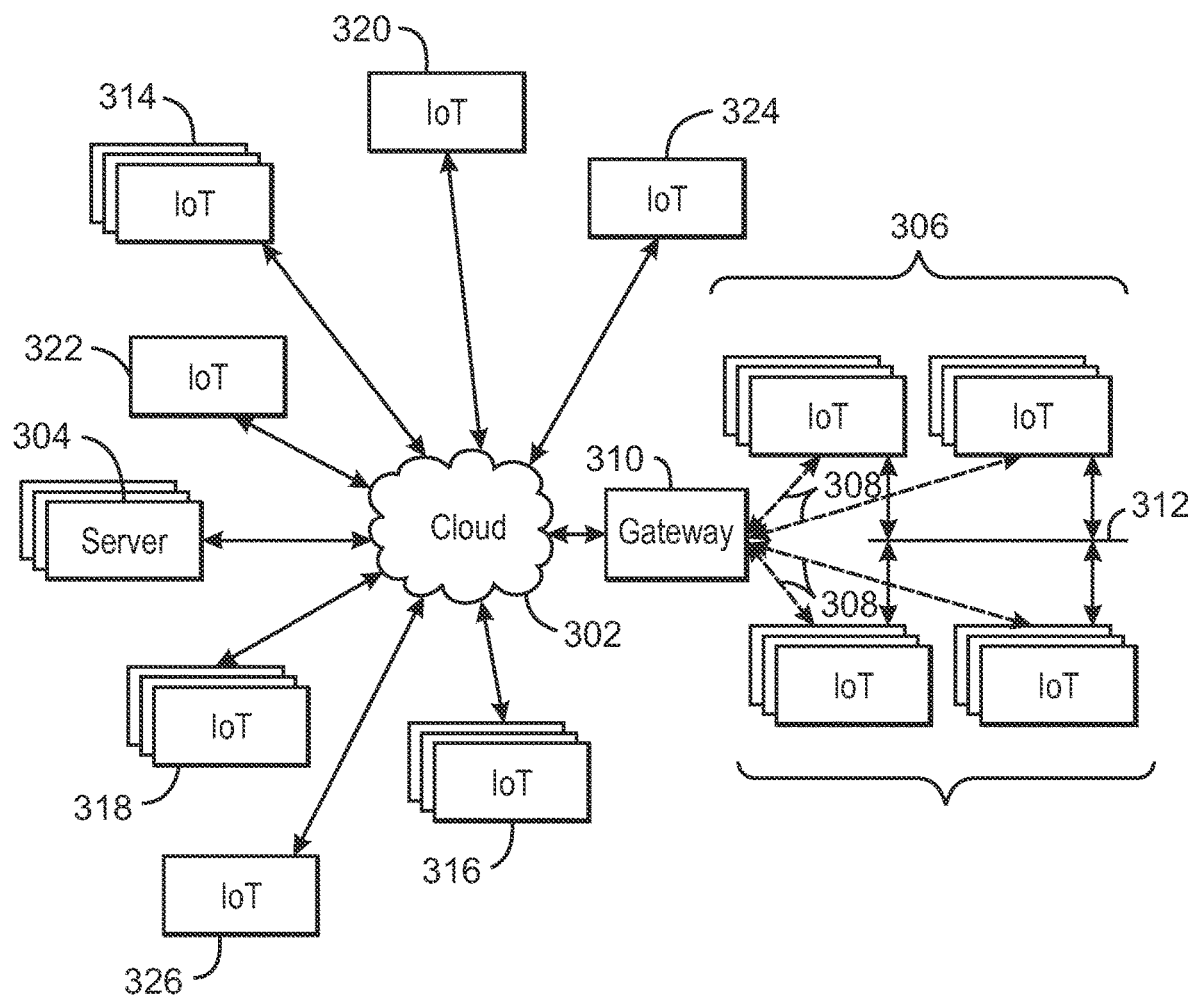
FIG. 3 is a drawing of a cloud computing network, or cloud, in communication with a number of IoT devices in accordance with some embodiments.

FIG. 3 is a drawing 300 of a cloud computing network, or cloud 302, in communication with a number of Internet of Things (IoT) devices in accordance with some embodiments. The cloud 302 may represent the Internet, or may be a local area network (LAN), or a wide area network (WAN), such as a proprietary network for a company. The IoT devices may include any number of different types of devices, grouped in various combinations. For example, a traffic control group 306 may include IoT devices along streets in a city. These IoT devices may include stoplights, traffic flow monitors, cameras, weather sensors, and the like. The traffic control group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a gateway 310 to communicate with the cloud 302.

Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the traffic control group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

Clusters of IoT devices, such as the remote weather stations 314 or the traffic control group 306, may be equipped to communicate with other IoT devices as well as with the cloud 302. This may allow the IoT devices to form an ad-hoc network between the devices, allowing them to function as a single device, which may be termed a fog device. The fog device is discussed further with respect to FIG. 4.

Figure 4:
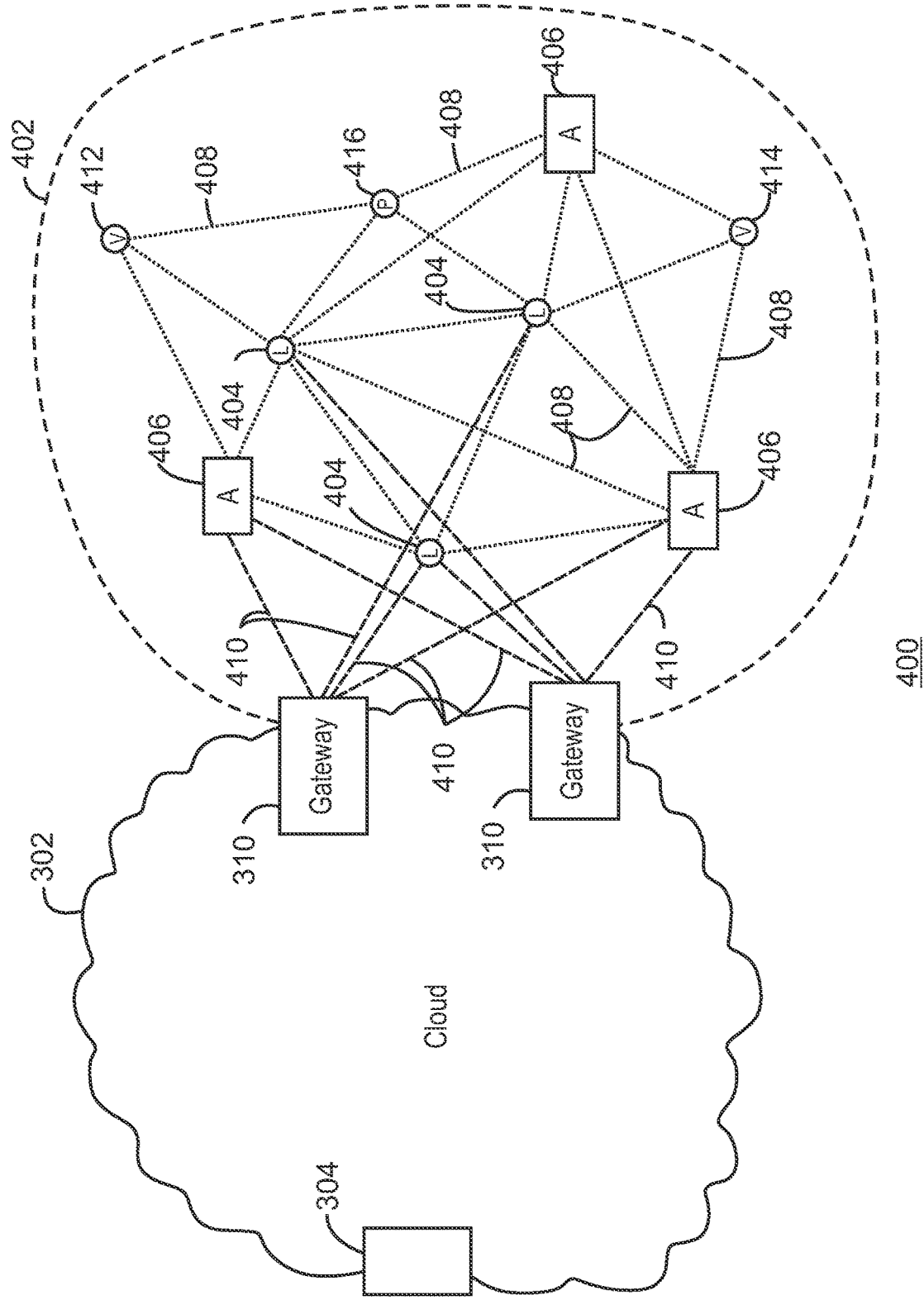
FIG. 4 is a drawing of a cloud computing network, or cloud, in communication with a mesh network of IoT devices, which may be termed a fog device, operating at the edge of the cloud in accordance with some embodiments.

FIG. 4 is a drawing 400 of a cloud computing network, or cloud 302, in communication with a mesh network of IoT devices, which may be termed a fog device 402, operating at the edge of the cloud 302 in accordance with some embodiments. Like numbered items are as described with respect to FIG. 3. As used herein, a fog device 402 is a cluster of devices that may be grouped to perform a specific function, such as traffic control, weather control, plant control, and the like.

In this example, the fog device 402 includes a group of IoT devices at a traffic intersection. The fog device 402 may be established in accordance with specifications released by the OpenFog Consortium (OFC), among others. These specifications allow the formation of a hierarchy of computing elements between the gateways 310 coupling the fog device 402 to the cloud 302 and to endpoint devices, such as traffic lights 404 and data aggregators 406 in this example. The fog device 402 can leverage the combined processing and network resources that the collective of IoT devices provides. Accordingly, a fog device 402 may be used for any number of applications including, for example, financial modeling, weather forecasting, traffic analyses, and the like.

For example, traffic flow through the intersection may be controlled by a plurality of traffic lights 404 (e.g., three traffic lights 404). Analysis of the traffic flow and control schemes may be implemented by aggregators 406 that are in communication with the traffic lights 404 and each other through a mesh network. Data may be uploaded to the cloud 302, and commands received from the cloud 302, through gateways 310 that are in communication with the traffic lights 404 and the aggregators 406 through the mesh network.

Any number of communications links may be used in the fog device 402. Shorter-range links 408, for example, compatible with IEEE 802.15.4 may provide local communications between IoT devices that are proximate to the intersection. Longer-range links 410, for example, compatible with LPWA standards, may provide communications between the IoT devices and the gateways 310. To simplify the diagram, not every communication link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others.

In some aspects, communications from one IoT device may be passed along the most convenient path to reach the gateways 310, for example, the path having the fewest number of intermediate hops, or the highest bandwidth, among others. In these networks, the number of interconnections provide substantial redundancy, allowing communications to be maintained, even with the loss of a number of IoT devices.

In some aspects, the fog device 402 can include temporary IoT devices. In other words, not all of the IoT devices may be permanent members of the fog device 402. For example, in the exemplary system 400, three transient IoT devices have joined the fog device 402, a first vehicle 412, a second vehicle 414, and a pedestrian 416. In these cases, the IoT device may be built into the vehicles 412 and 414, or may be an app on a smart phone carried by the pedestrian 416. Other IoT devices may also be present, such as IoT devices in bicycle computers, motorcycle computers, drones, and the like.

The fog device 402 formed from the IoT devices may be presented to clients in the cloud 302, such as the server 304, as a single device located at the edge of the cloud 302. In this example, the control communications to specific resources in the fog device 402 may occur without identifying any specific IoT device within the fog device 402. Accordingly, if one IoT device within the fog device 402 fails, other IoT devices in the fog device 402 may be able to discover and control a resource, such as an actuator, or other device attached to an IoT device. For example, the traffic lights 404 may be wired so as to allow any one of the traffic lights 404 to control lights for the other traffic lights 404. The aggregators 406 may also provide redundancy in the control of the traffic lights 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the pedestrian 416, join the fog device 402.

As the pedestrian 416 is likely to travel more slowly than the vehicles 412 and 414, the fog device 402 may reconfigure itself to ensure that the pedestrian 416 has sufficient time to make it through the intersection. This may be performed by forming a temporary group of the vehicles 412 and 414 and the pedestrian 416 to control the traffic lights 404. If one or both of the vehicles 412 or 414 are autonomous, the temporary group may instruct the vehicles to slow down prior to the traffic lights 404. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 404 may still be important for the pedestrian 416, cyclists, or non-autonomous vehicles.

As the transient devices 412, 414, and 416, leave the vicinity of the intersection of the fog device 402, the fog device 402 may reconfigure itself to eliminate those IoT devices from the network. As other transient IoT devices approach the intersection, the fog device 402 may reconfigure itself to include those devices.

The fog device 402 may include the traffic lights 404 for a number of intersections, such as along a street, along with all of the transient IoT devices along the street. The fog device 402 may then divide itself into functional units, such as the traffic lights 404 and other IoT devices proximate to a single intersection. This type of combination may enable the formation of larger IoT constructs, e.g., groups of IoT devices that perform a particular function, in the fog device 402.

For example, if an emergency vehicle joins the fog device 402, an emergency construct, or virtual device, may be created that includes all of the traffic lights 404 for the street, allowing control of the traffic flow patterns for the entire street. The emergency construct may instruct the traffic lights 404 along the street to stay red for opposing traffic and green for the emergency vehicle, expediting the passage of the emergency vehicle.

As illustrated by the fog device 402, the organic evolution of IoT networks is central to improving or maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Blockchains may be used to decentralize identification as they may provide agreement between devices regarding names and identities that are in current use. As used herein, a blockchain is a distributed database of identity records that is made up of data structure blocks. Further, as used herein, the term blockchain may include any one or more of other distributed ledger systems. Other distributed ledger approaches include Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Figure 5:
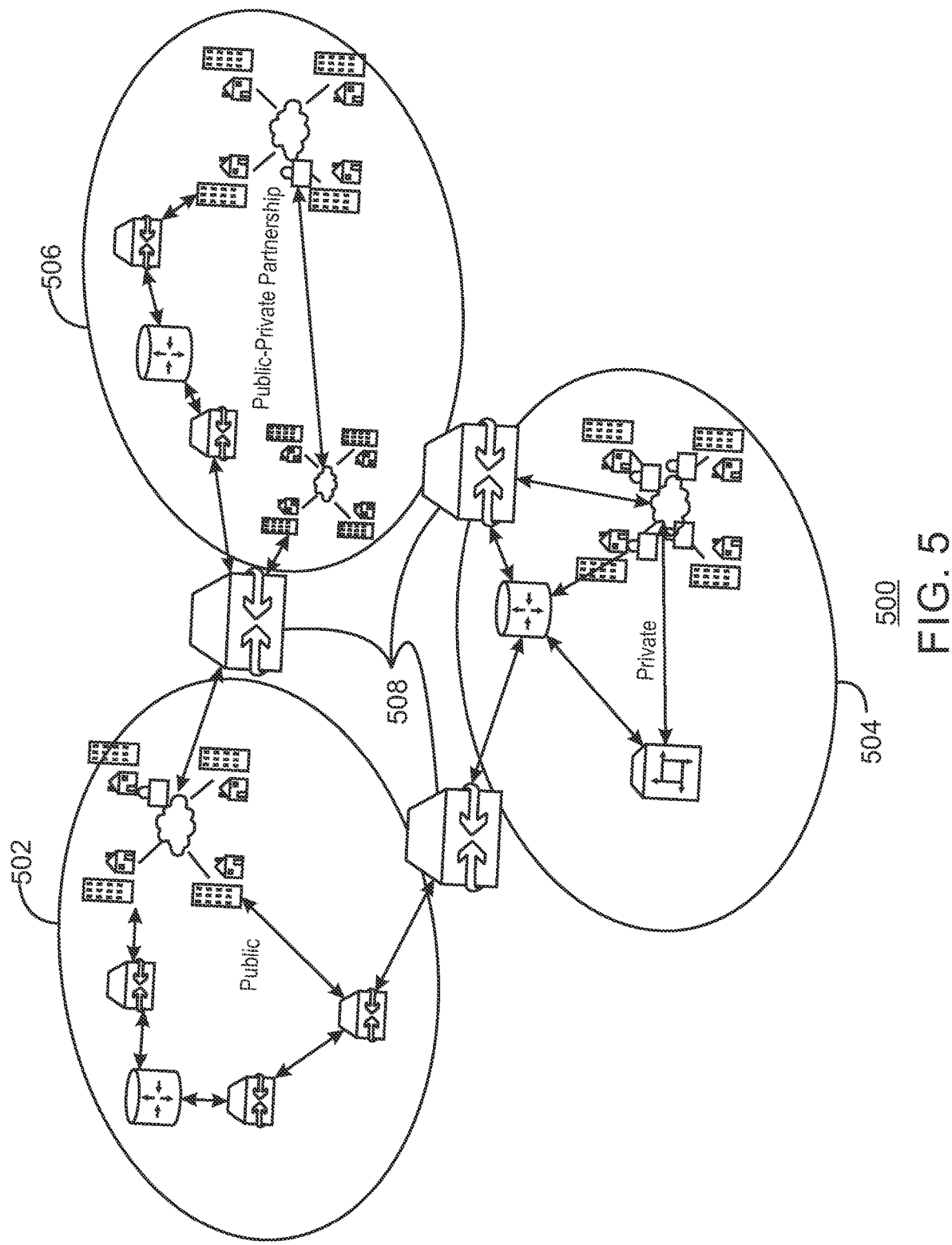
FIG. 5 is a schematic drawing illustrating interoperability across public domains, private domains, and public-private domains in accordance with some embodiments.

FIG. 5 is a schematic drawing 502 illustrating interoperability across public domains 502, private domains 504, and public-private domains 506 in accordance with some embodiments. The network topology may be in a continuous state of change, making any attempt at permanent maps impossible. Accordingly, IoT devices may use the backbone resources, such as domain name servers (DNS) to send packets between domains. The packets may be routed between the domains 502, 504, and 506 through the Internet backbone, shown as routers 508.

In some aspects, the routers 508 provide the edge connections that couple the domains to one another. As described herein, any number of services may be provided at the edges of the domains 502, 504, and 506 to enhance the interconnectivity. For example, interconnections between the public domain 502 and the private domains 504 may provide opportunities for micropayments for domain access, explicit permission and tracking for domain access, and the separation of public and private traffic, among others. Similarly, interconnections between the public domain 502 and the public-private domain 506 may provide opportunities for services such as time-based leases, resource marketplaces, and distributed identity servers, among others. Interconnections between the private domains 504 and the public-private domains 506 may provide opportunities for inline service interconnects, behavior based threat analysis, and proof-of-provenance, among others.

Figure 6:
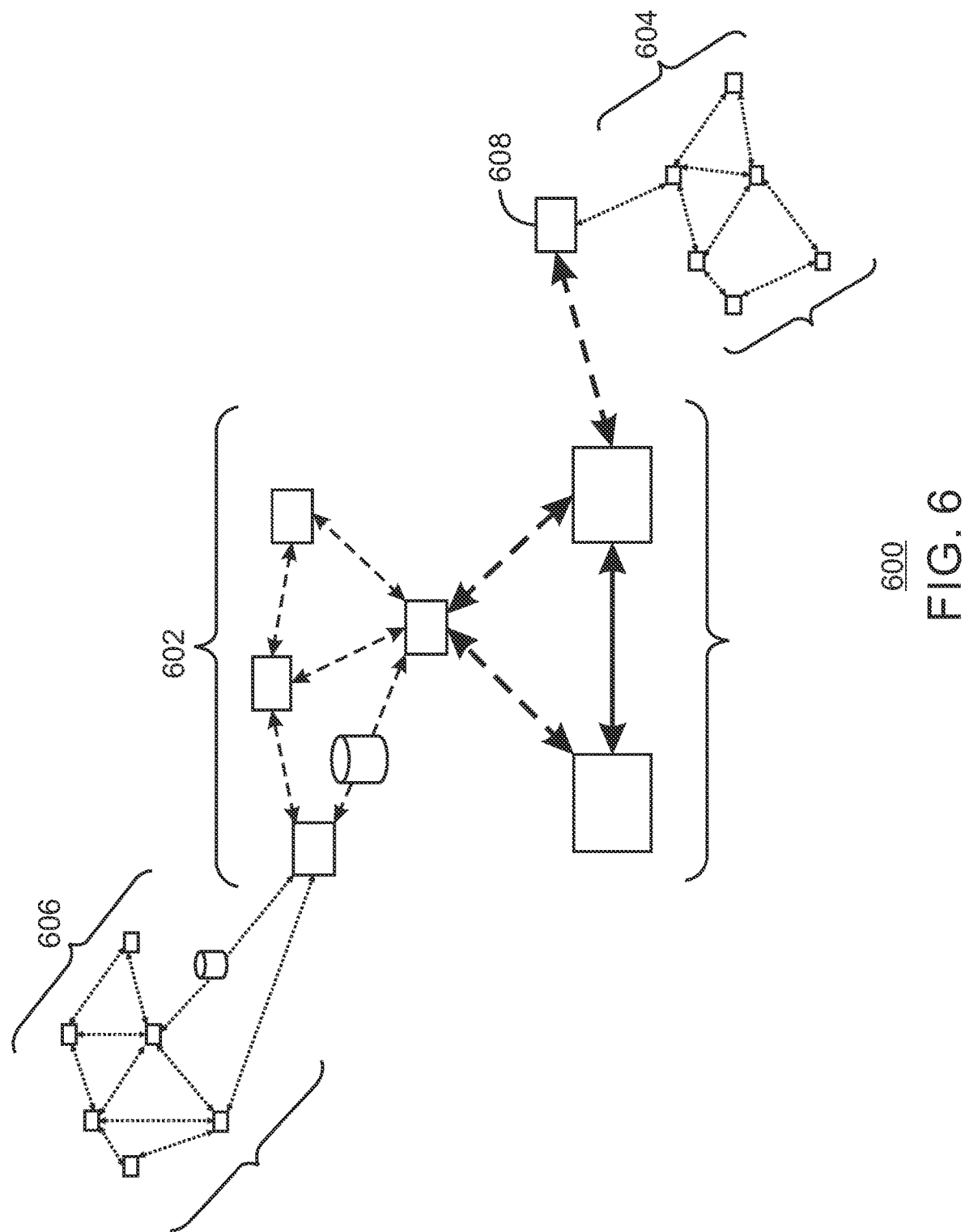
FIG. 6 is a schematic drawing of interoperability across a heterogeneous network of wired networks and wireless networks in accordance with some embodiments.

FIG. 6 is a schematic drawing of interoperability across a heterogeneous 600 network of wired networks 602 and wireless networks 604 and 606 in accordance with some embodiments. The wireless networks 604 and 606 may be communicatively coupled by devices in the wired network 602. This provides opportunities for efficiency improvements in communications between devices in the wireless networks 604 and 606, as well as improvements in communications between devices in a wireless network 604 or 606 and a device in the wired network 602. For example, edge device 608 coupling a first wireless network 604 to the wired network 602 may provide a data to information transform to reduce the size of the payload. Further, the edge device 608 may have a permissioning system that allows packets from the first wireless network 604 to pass, while blocking unpermitted packets from transferring. The permissioning system may include systems to make micropayments to allow the information to move across the wired network 602. As an example, the first wireless network 604 may be a ground moisture sensor array on an agricultural site. The reporting frequency may depend on the rate of change, which may increase costs due to the need to purchase bandwidth to match the highest reporting rate. Thus, a micropayment system may lower costs by allowing transactions to paid for on an as-needed basis.

Figure 7:
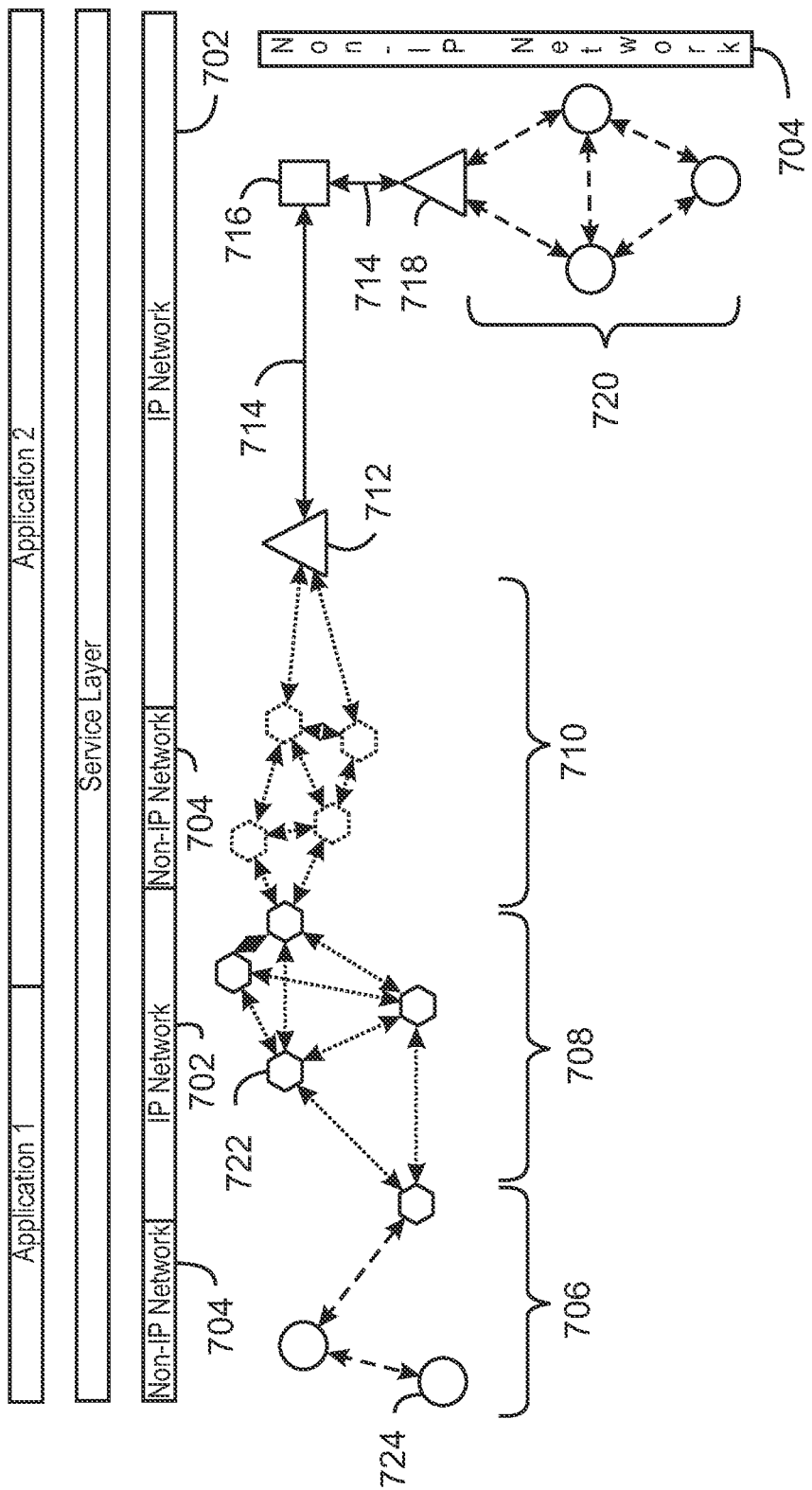
FIG. 7 is a drawing of a heterogeneous network (hetnet) infrastructure, connecting IP domains to non-IP domains at multiple stages in accordance with some embodiments.

FIG. 7 is a drawing of a heterogeneous network (hetnet) infrastructure 700, connecting IP domains 702 to non-IP domains 704 at multiple stages in accordance with some embodiments. In this example, an LPWA domain 706 is in communications with an IEEE 802.15.4g mesh network 708. The mesh network 708 is in communications with an IEEE 802.15.4 mesh network 710. An access point 712 provides a communications connection 714 (e.g., an Ethernet connection) to a core network 716. The core network 716 may be coupled to a second access point 718. The second access point 718 may provide communications to a second LPWA network 720. The different permutations of IP domains 702 and non-IP domains 704, coupled with providing support for a substantial number of services, militates against dedicated translation nodes. Further, dynamic interconnections may be useful for interacting with volatile IoT infrastructure, in which nodes can join networks, leave networks, and may be mobile.

For example, data from different domains may be efficiently transmitted from a source to a target destination by the use of protocol packing. In this example, a protocol frame in a first protocol may be packaged into the payload field of a packet in another protocol. By adopting this approach, both protocols remain standards-compliant. As described further with respect to FIG. 8, a LoRaWAN frame received at a gateway 722 from a sensor 724 in fog device, such as a LoRaWAN network 706, may be packaged into an IEEE 802.15.4 frame, before being sent on. Further protocol packing may be performed at the first access point 712. At the target device, for example, a second access point 718, the packaging may be removed, and the frame sent on to a target device 724. This may be used for communications in fog devices that include remote devices that are accessed over different networks, or through a core network 716.

Figure 8:
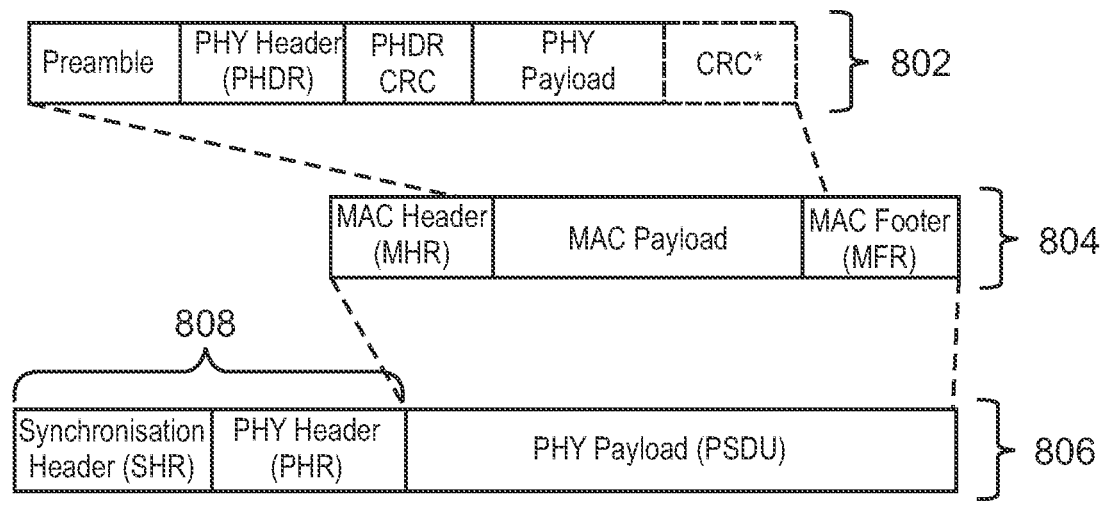
FIG. 8 is a schematic drawing of protocol packing used to package frames from one protocol into another protocol in accordance with some embodiments.

FIG. 8 is a schematic drawing 800 of protocol packing used to package frames from one protocol into another protocol in accordance with some embodiments. In the example shown in the schematic drawing 800, a LoRaWAN frame 802 is packed into the payload field of a packet 804, which is included in an IEEE 802.15.4 MAC frame 806. The MAC frame 806 has the headers 808 that form a transmission frame for transmission to the destination.

Any number of other data link layer and transport encapsulation targets can be supported using this method. For example, frames following the Data Over Cable Service Interface Specification (DOCSIS) protocol may be encapsulated in packets of the AX.25 protocol. DOCSIS is used for high data rate transfer over cable and wireless systems. It is predominately used for high data rate transfer, such as broadband internet and television services. AX.25 was developed by the Tucson Amateur Packet Radio (TAPR) and American Radio Relay League (ARRL) organizations in 1996 with an update in 1998. AX.25 is a data link layer protocol derived from the AX.25 protocol and was primarily designed for use in impaired narrowband wireless networks, predominately in the amateur radio bands.

Figure 9:
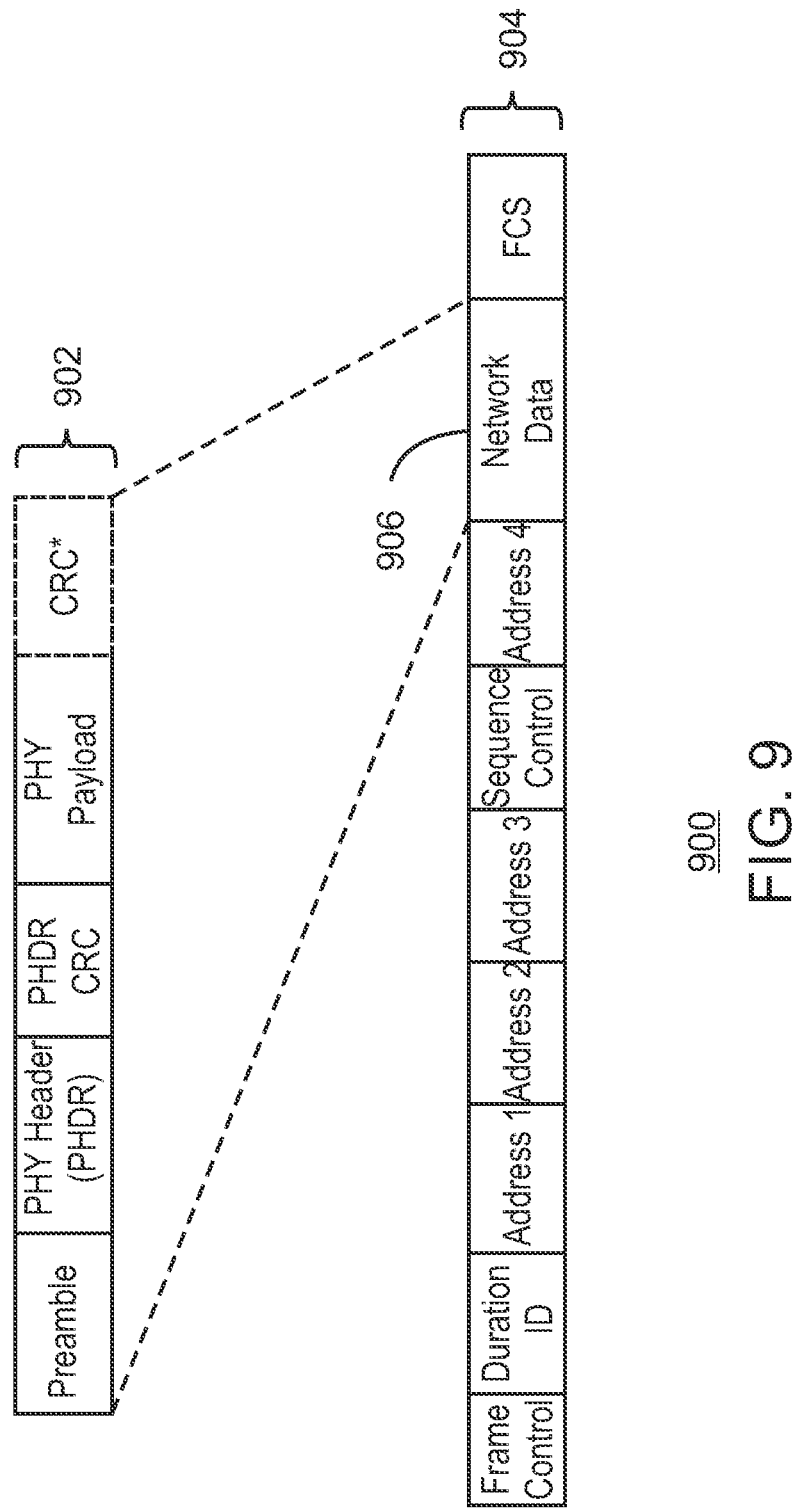
FIG. 9 is a schematic drawing of protocol packing used to package a Low Power Wide Area Network (LPWAN) protocol frame, such as a LoRaWAN frame inside an IEEE 802.11 (or Wi-Fi®) media access control (MAC) layer frame in accordance with some embodiments.

FIG. 9 is a schematic drawing 900 of protocol packing used to package a LoRaWAN frame 902 inside an IEEE 802.11 (or Wi-Fi®) MAC frame 904 in accordance with some embodiments. As shown in the schematic drawing 900, the LoRaWAN frame 902 may be inserted as the network data 906 in the IEEE 802.11 MAC frame 904. When the IEEE 802.11 MAC frame 904 reached the destination, such as a gateway leading to a LPWA network, the LoRaWAN frame 902 may be read from the IEEE 802.11 MAC frame 904 and transmitted to a destination.

Figure 10:
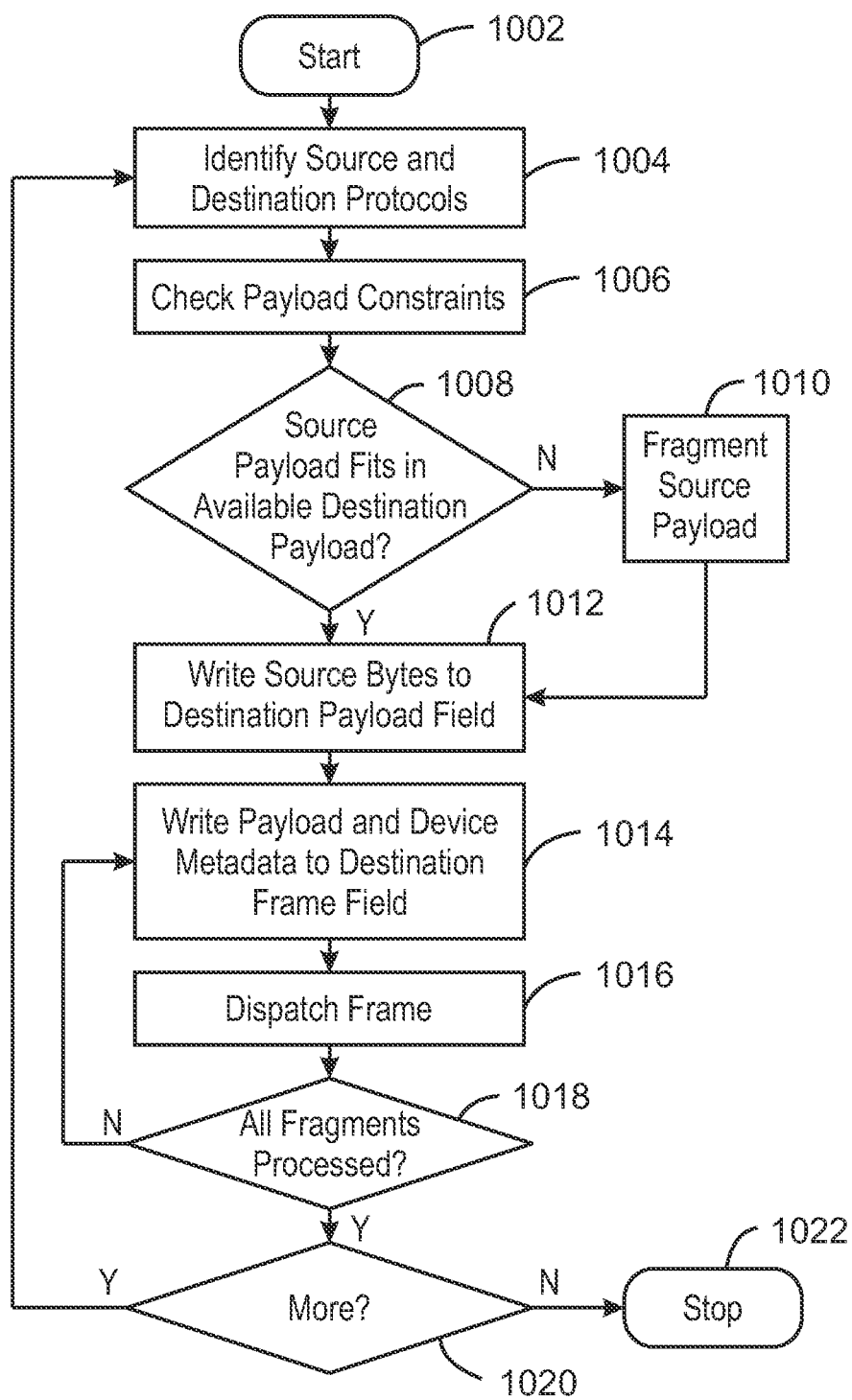
FIG. 10 is a process flow diagram of an example method for protocol packing for the transmission of a frame in accordance with some embodiments.

FIG. 10 is a process flow diagram of an example method 1000 for protocol packing for the transmission of a frame in accordance with some embodiments. The method 1000 described with respect to FIG. 10 may be implemented by the IoT device 1100 described with respect to FIG. 11. The block 1002 represents, for example, when data is ready to be sent out.

At block 1004, the source and destination protocols available are identified. An inventory of available protocols may be created and stored in the gateway or access point, and the ingress and egress protocols for the protocol packaging are identified. The payload sizes and constraints associated with each protocol, for example, the required frame field information, such as addresses, flags, and the like, are identified.

At block 1006, the payload constraints are checked against the payload, for example, the source frame, to be transmitted. At block 1008, a determination is made as to whether a source frame fits in the destination protocol payload. If not, at block 1010, the payload is fragmented into multiple payloads. This may be performed, for example, by splitting the payload into N byte sequences. Each byte sequence may be placed into a separate destination protocol frame and the packet sequences are numbered.

At block 1014, the payload and device metadata are written to the destination field. At block 1016, the frame is dispatched towards the destination. At block 1018, a determination is made as to whether all fragments of the data have been processed. If not, process flow returns to block 1014 to write and send the next fragment.

At block 1020, a determination is made as to whether more data is to be sent, for example, another ingress frame has been received. If so, process flow returns to block 1004 to process the next frame. If not, the method 1000 ends at block 1022, at which point the device waits for another frame to be received.

Figure 11:
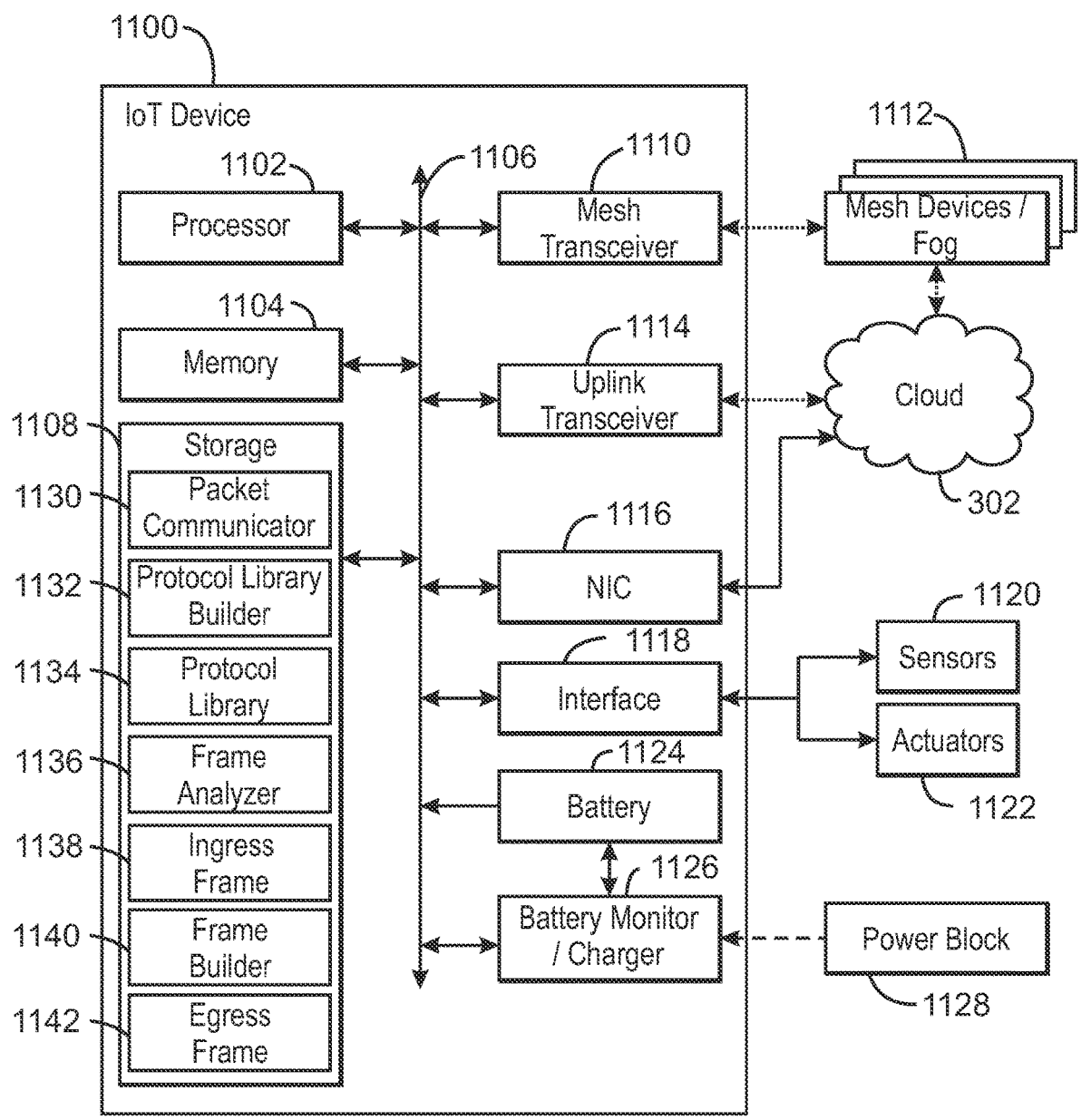
FIG. 11 is a block diagram of an example of components that may be present in an IoT device to package frames in a first protocol in frames of a different protocol in accordance with some embodiments.

FIG. 11 is a block diagram of an example of components that may be present in an IoT device 1100 to package frames in a first protocol in frames of a different protocol in accordance with some embodiments. Like numbered items are as described with respect to FIG. 3. It can be noted that different components may be selected and used for the IoT device 1100 than for those selected for other IoT devices discussed herein.

The IoT device 1100 may include any combinations of the components shown in the example. The components may be implemented as ICs, portions thereof, discrete electronic devices, or other modules, logic, hardware, software, firmware, or a combination thereof adapted in the IoT device 1100, or as components otherwise incorporated within a chassis of a larger system. The block diagram of FIG. 11 is intended to show a high level view of components of the IoT device 1100. However, some of the components shown may be omitted, additional components may be present, and different arrangement of the components shown may occur in other implementations.

The IoT device 1100 may include a processor 1102, which may be a microprocessor, a multi-core processor, a multithreaded processor, an ultra-low voltage processor, an embedded processor, or other known processing element. The processor 1102 may be a part of a system on a chip (SoC) in which the processor 1102 and other components are formed into a single integrated circuit, or a single package, such as the Edison™ or Galileo™ SoC boards from Intel. As an example, the processor 1102 may include an Intel® Architecture Core™ based processor, such as a Quark™, an Atom™, an i3, an i5, an i7, or an MCU-class processor, or another such processor available from Intel® Corporation, Santa Clara, CA. However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 1102 may communicate with a system memory 1104 over a bus 1106. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1108 may also be coupled to the processor 1102 via the bus 1106. To enable a thinner and lighter system design, the mass storage 1108 may be implemented via a solid state drive (SSD). Other devices that may be used for the mass storage 1108 include flash memory cards, such as SD cards, microSD cards, xD picture cards, and the like, and USB flash drives.

In low power implementations, the mass storage 1108 may be on-die memory or registers associated with the processor 1102. However, in some examples, the mass storage 1108 may be implemented using a micro hard disk drive (HDD). Further, any number of new technologies may be used for the mass storage 1108 in addition to, or instead of, the technologies described, such resistance change memories, phase change memories, holographic memories, or chemical memories, among others. For example, the IoT device 1100 may incorporate the 3D XPOINT memories from Intel® and Micron®.

The components may communicate over the bus 1106. The bus 1106 may include any number of technologies, including industry standard architecture (ISA), extended ISA (EISA), peripheral component interconnect (PCI), peripheral component interconnect extended (PCIx), PCI express (PCIe), or any number of other technologies. The bus 1106 may be a proprietary bus, for example, used in a SoC based system. Other bus systems may be included, such as an I²C interface, I³C interface, an SPI interface, point to point interfaces, and a power bus, among others.

The bus 1106 may couple the processor 1102 to a mesh transceiver 1110, for communications with other mesh devices 1112. The mesh transceiver 1110 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1112. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1110 may communicate using multiple standards or radios for communications at different range. For example, the IoT device 1100 may communicate with geographically proximate devices, e.g., within about 10 meters, using a local transceiver based on BLE, or another low power radio, to save power. More distant mesh devices 1112, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1110 may be incorporated into an MCU as an address directly accessible by the chip, such as in the Curie® units available from Intel.

An uplink transceiver 1114 may be included to communicate with devices in the cloud 302. The uplink transceiver 1114 may be LPWA transceiver that follows the IEEE 802.15.4, IEEE 802.15.4g, IEEE 802.15.4e, IEEE 802.15.4k, or NB-IoT standards, among others. The IoT device 1100 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1110 and uplink transceiver 1114, as described herein. For example, the radio transceivers 1110 and 1112 may include an LTE or other cellular transceiver that uses spread spectrum (SPA/SAS) communications for implementing high-speed communications, such as for video transfers. Further, any number of other protocols may be used, such as Wi-Fi® networks for medium speed communications, such as still pictures, sensor readings, and provision of network communications.

The radio transceivers 1110 and 1112 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+(High-speed Packet Access Plus), UMTS-TDD (Universal Mobile Telecommunications System—Time-Division Duplex), TD-CDMA (Time Division—Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1114, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1116 may be included to provide a wired communication to the cloud 302 or to other devices, such as the mesh devices 1112. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1116 may be included to allow connect to a second network, for example, a NIC 1116 providing communications to the cloud over Ethernet, and a second NIC 1116 providing communications to other devices over another type of network.

The bus 1106 may couple the processor 1102 to an interface 1118 that is used to connect external devices. The external devices may include sensors 1120, such as accelerometers, level sensors, flow sensors, temperature sensors, pressure sensors, barometric pressure sensors, and the like. The interface 1118 may be used to connect the IoT device 1100 to actuators 1122, such as power switches, valve actuators, an audible sound generator, a visual warning device, and the like.

While not shown, various input/output (I/O) devices may be present within, or connected to, the IoT device 1100. For example, a display may be included to show information, such as sensor readings or actuator position. An input device, such as a touch screen or keypad may be included to accept input.

A battery 1124 may power the IoT device 1100, although in examples in which the IoT device 1100 is mounted in a fixed location, it may have a power supply coupled to an electrical grid. The battery 1124 may be a lithium ion battery, a metal-air battery, such as a zinc-air battery, an aluminum-air battery, a lithium-air battery, a hybrid supercapacitor, and the like.

A battery monitor/charger 1126 may be included in the IoT device 1100 to track the state of charge (SoCh) of the battery 1120. The battery monitor/charger 1126 may be used to monitor other parameters of the battery 1124 to provide failure predictions, such as the state of health (SoH) and the state of function (SoF) of the battery 1124. The battery monitor/charger 1126 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, TX. The battery monitor/charger 1126 may communicate the information on the battery 1124 to the processor 1102 over the bus 1106. The battery monitor/charger 1126 may also include an analog-to-digital (ADC) convertor that allows the processor 1102 to directly monitor the voltage of the battery 1126 or the current flow from the battery 1124. The battery parameters may be used to determine actions that the IoT device 1100 may perform, such as transmission frequency, mesh network operation, sensing frequency, and the like.

A power block 1128, or other power supply coupled to a grid, may be coupled with the battery monitor/charger 1126 to charge the battery 1124. In some examples, the power block 1128 may be replaced with a wireless power receiver to obtain the power wirelessly, for example, through a loop antenna in the IoT device 1100. A wireless battery charging circuit, such as an LTC4020 chip from Linear Technologies of Milpitas, CA, among others, may be included in the battery monitor/charger 1126. The specific charging circuits chosen depend on the size of the battery 1124, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1128 may be augmented or replaced with solar panels, a wind generator, a water generator, or other natural power systems.

The mass storage 1108 may include a number of modules to implement the coalition group formation described herein. Although shown as code blocks in the mass storage 1108, it may be understood that any of the modules may be fully or partially replaced with hardwired circuits, for example, built into an application specific integrated circuit (ASIC).

The mass storage 1108 may include a communicator 1130 that accepts frames from mesh devices 1112 or devices in the cloud 302, and relays the frames to other mesh devices 1112, devices in the cloud 302, and the like. In addition to the functions described with respect to FIG. 11, the communicator 1130 may perform other functions, such as translation of frames between protocols, performing proof-of-provenance additions, and the like. Further, the communicator 1130 may be part of an easement system.

A protocol library builder 1132 may determine what protocols are available, and construct a protocol library 1134 storing the protocols and formats for each. The formats may include constraints, such as data field length, and the like, that can be used to determine how to format the frame, such as breaking the ingress frame into fragments for transmission in multiple egress frames.

A frame analyzer 1136 may be used to analyze the ingress frame 1138, received from the sending device, to determine length, packaging protocol, and other constraints. A frame builder 1140 may build an egress frame 1142 using the constraints determined. For example, the frame builder 1140 may build multiple egress frames 1142 if the ingress frame 1138 is too large to fit within the payload field for the egress frame 1142. Once the egress frame 1142, or egress frames, are built, the communicator 1130 may transmit them towards the destination.

Figure 12:
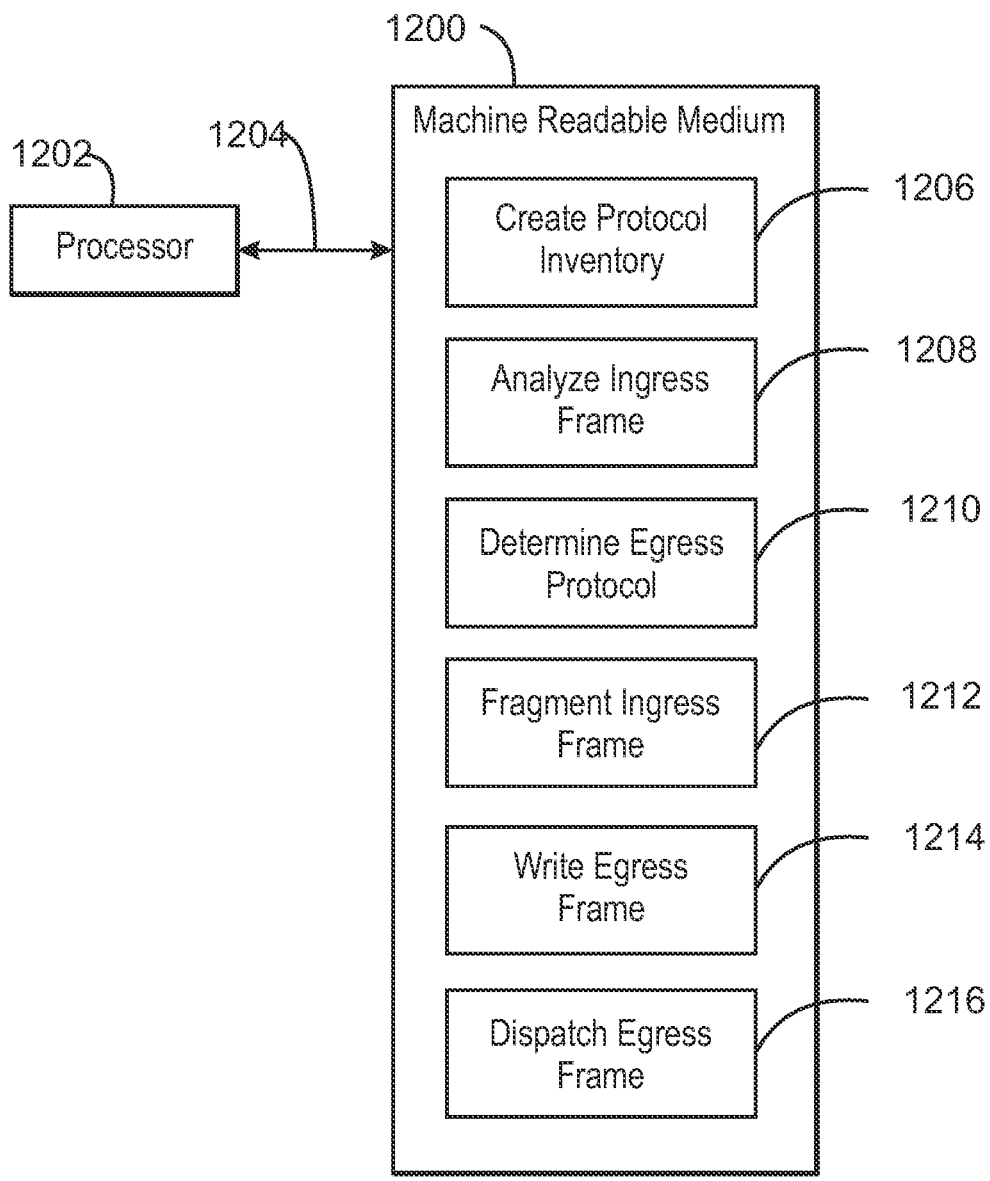
FIG. 12 is a block diagram of a non-transitory, machine readable medium including code to direct a processor to package frames in a first protocol in frames of a different protocol in accordance with some embodiments.

FIG. 12 is a block diagram of an exemplary non-transitory, machine readable medium 1200 including code to direct a processor 1202 to package frames in a first protocol in frames of a different protocol. The processor 1202 may access the non-transitory, machine readable medium 1200 over a bus 1204. The processor 1202 and bus 1204 may be implemented in a manner similar to the processor 1102 and bus 1104 described with respect to FIG. 11. The non-transitory, machine readable medium 1200 may include devices described for the mass storage 1108 of FIG. 11 or may include optical disks, thumb drives, or any number of other hardware devices. The non-transitory, machine readable medium 1200 may include code 1206 to direct the processor 1202 to create an inventory of possible ingress and egress protocols. Code 1208 may be included to direct the processor 1202 to analyze an ingress frame to determine size and other constraints. Code 1210 may be included to direct the processor 1202 to determine a protocol for an egress frame. Code 1212 may be included to direct the processor 1202 to fragment the ingress frame if it is too large to fit within the payload field of the egress frame. The codes 1210 may direct the processor to label each fragment with a sequence number for correct reassembly at a destination. Code 1214 may be included to direct the processor 1202 to write an egress frame, for example, by placing the ingress frame, or a fragment of the ingress frame with an associated sequence number, in the payload field of the egress frame. Code 1216 may be included to direct the processor 1202 to route the egress frame towards a destination, for example, by sending the frame on to a subsequent device with an address indicating the final destination.

In addition to packaging frames of different protocols within other protocol, the increasing use of complex data structures in low overhead communications, such as LoRaWAN, indicates the utility of more advanced framing. A new framing structure is described with respect to FIG. 13.

Figure 13:
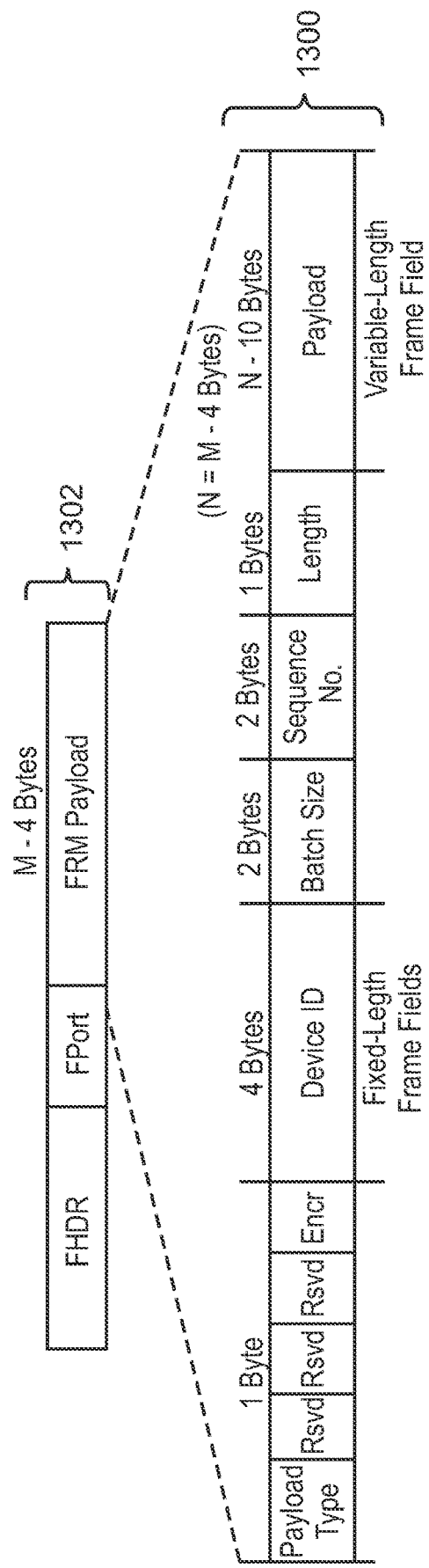
FIG. 13 is a drawing of a frame structure that may be used as a payload in a low power wide area (LPWA) frame, such as a LoRaWAN frame in accordance with some embodiments.

FIG. 13 is a drawing of a payload structure 1300 that may be used as the payload in a low power wide area (LPWA) frame 1302, such as a LoRaWAN frame in accordance with some embodiments. The payload structure 1300 may be used for multi-modal data, including, for example, information from one or multiple sources that may be in aggregated, fragmented, interleaved, or otherwise constructed. These types of multi-modal data may often result in data sizes that require more than one LPWA frame 1302 to dispatch to the intended destination.

The payload structure 1300 specification provides a minimal frame overhead. The frame overhead may be as described in Table 1.

TABLE 1

| Total Frame Overhead: 10 bytes | |
|---|---|
| Payload Type | 4 bits |
| Reserved (rsvd) | 1 bit |
| Reserved (rsvd) | 1 bit |
| Reserved (rsvd) | 1 bit |
| Encryption (encr) | 1 bit |

TABLE 1-continued

| Total Frame Overhead: 10 bytes | |
|---|---|
| Device ID | 4 bytes |
| Batch Size | 2 bytes |
| Sequence No. | 2 bytes |
| Length | 1 byte |
| Payload | N-10 bytes (variable length field) |

In some aspects, the payload type identifier identifies the type of data carried in the payload structure 1300, such as an image, a 24-bit GPS report, or a 3×2 byte sensor report, among others. Examples of values that may be used for the payload type identifier are present in Table 2. As this is a four-bit field, 15 possible identifiers may be used.

TABLE 2

| Payload type identifiers | |
|---|---|
| Value | Payload type |
| 0x0 | Invalid |
| 0xA | Image (JPEG) |
| 0xB | Image (PNG) |
| 0x1 | GPS report (24-bit format) |
| 0x2 | GPS report (IEEE 754 format) |
| 0x3 | 3 × 2-byte sensor (temp/pressure/rainfall) |
| 0x4 | Battery + 2-byte lat./long. GPS report |

In some aspects, the frame overhead may include an encryption flag to indicate if the payload is encrypted, for example, Encr=0x1 for encrypted, and Encr=0x0 for unencrypted. The Device ID can include a string (e.g., a four-byte string) that presents the unique identifier for the sending device. This may be the identifier assigned using the blockchain methods described herein, or may be a manufacturers assigned name, among others. The Device ID field may be used, for example, to support any number of endpoint IDs per radio head. In some examples, a two-byte identifier may be used to support up to 65535 endpoint IDs per radio head, assuming ID zero is invalid.

The batch size indicates the number of payloads included in a single message. The sequence number indicates the position of the particular payload structure 1300 in a sequence for reassembly. The length of the payload field is carried in the length field. The LoRa frame encapsulation may provide a message integrity check (MIC) for uplink messages. If not, a separate MIC field may be included in the frame 1302 above.

In some aspects, the payload for longer messages may need to be fragmented across multiple frames. These frames do not have to be sequentially sent in an IoT network, but may be sent over parallel radio channels to decrease the transmission time and improve the transmission efficiency. This technique, termed Network Division Multiplexing (NDM), is a networking protocol-agnostic method of splitting data into multiple independent parallel data subsets and conveying them over multiple network paths before recombination at the destination. The technique leverages the ability to overlay multiple data streams operating in parallel over different interconnected network paths and infrastructure, for example, using different protocols. NDM supports multiple same-network paths, such as a number of LPWA paths, or multiple different network infrastructure paths, such as a number of LPWA paths in concert with a number of IEEE 802.15.4g routes.

The alignment of the data stream and lossy network characteristics affecting one or more of the NDM paths may adversely affect recombination at the destination. However, these problems may be decreased by the integration of adaptive delay/disruption tolerant protocols, such as the Licklider Transmission Protocol (LTP), which may be used as the convergence layer for a fault tolerant protocol, such as the Bundle Protocol (BP) described at http://www.rfc-editor.org/rfc/pdfrfc/rfc5050.txt.pdf (last accessed on Aug. 25, 2016).

In LTP, data may be identified as important and less important. Important data, such as headers, must be accurately transmitted and receipt acknowledged, before the data is discarded by the sending unit. Less important data, such as a single pixel in a picture, may be recoverable from the transmission or less important if lost, and, thus, the data may be discarded after being sent. Due to the extreme latency, no negotiations are performed before initiating communications. The following figures described the transmission of data using the NDM technique.

Figure 14:
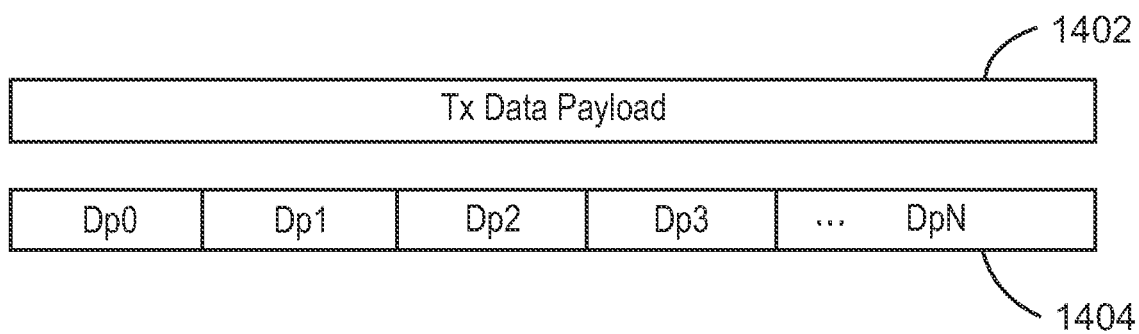
FIG. 14 is a schematic drawing of transmission data payload being fragmented into a number of sub-blocks for sending in accordance with some embodiments.

FIG. 14 is a schematic drawing 1400 of transmission data payload 1402 being fragmented into a number of sub-blocks 1404 for sending in accordance with some embodiments. Each of the sub-blocks 1404 may have a variable length, $L_i$. The sub-blocks 1402 may be assigned to N network paths where one or more network protocols or PHYs are used.

Sub-header data may then be appended to each sub-block 1404, for example, each frame in a data sub-stream may be encapsulated with header data to denote the sub-stream order in the main data payload to support recombination at the destination. The header data may also include a max transit time, for example, a time to live, as well as a priority ordering and a retry policy. Once the header information is attached, the sub-blocks 1404 may be packaged into the different protocol frames used for the transmission, for example, as described with respect to FIG. 10 above.

Figure 15:
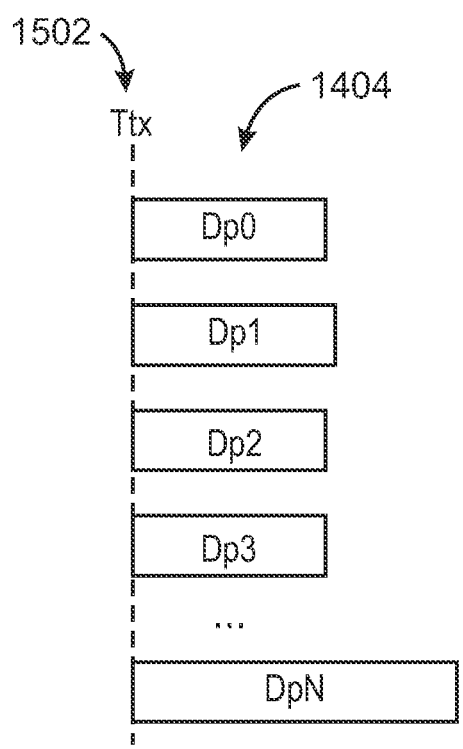
FIG. 15 is a schematic drawing of Network Division Multiplexing (NDM)-serial-to-parallel transmission in accordance with some embodiments.

FIG. 15 is a schematic drawing 1500 of NDM-serial-to-parallel transmission in accordance with some embodiments. The sub-blocks 1404 may be dispatched at time $T_{tx}$ 1502 for synchronized dispatch mode. In some cases, the sub-blocks 1404 may be sent in a synchronized per-path dispatch mode, at times $T_{tx}[i]$, in which each [i] represents a transmission path.

Figure 16:
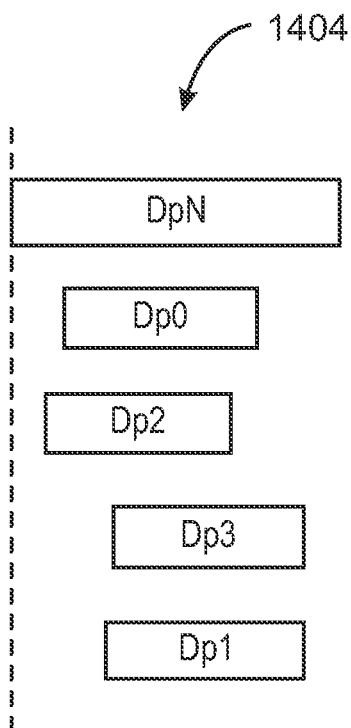
FIG. 16 is a schematic drawing of the reception of the sub-blocks in accordance with some embodiments.

FIG. 16 is a schematic drawing 1600 of the reception of the sub-blocks 1404 in accordance with some embodiments. At the destination, or other intended interception point, the sub-blocks 1404 may be received in a different order than when dispatched and at different time offsets. The sub-blocks 1404 may be unpackaged, if packaged in a different protocol, and analyzed to determine the number and order of sub-blocks 1404 expected for the message. The sub-blocks 1404 may then be held until all parts are received before being reassembled into the TX data payload 1402 of FIG. 14.

Figure 17:
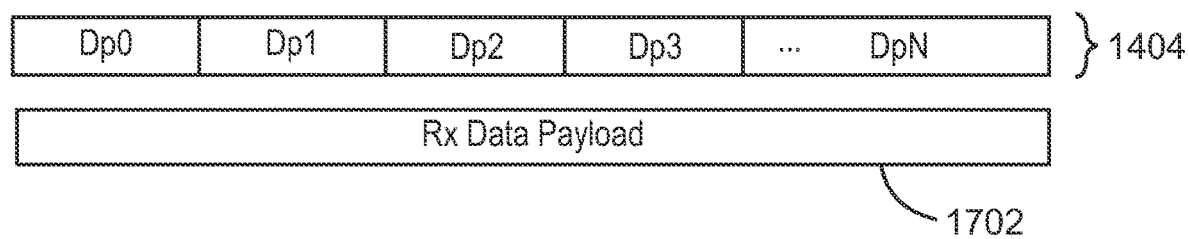
FIG. 17 is a schematic drawing of the recombination of the sub-blocks to form the received data payload in accordance with some embodiments.

FIG. 17 is a schematic drawing 1700 of the recombination of the sub-blocks 1404 to form the received data payload 1702 in accordance with some embodiments. Conversion from parallel to serial block form takes place using header data in each sub-block 1404 to identify block ordering. Depending on the instructions in the header, reassembly may occur even if sub-blocks 1702 are missing.

Figure 18:
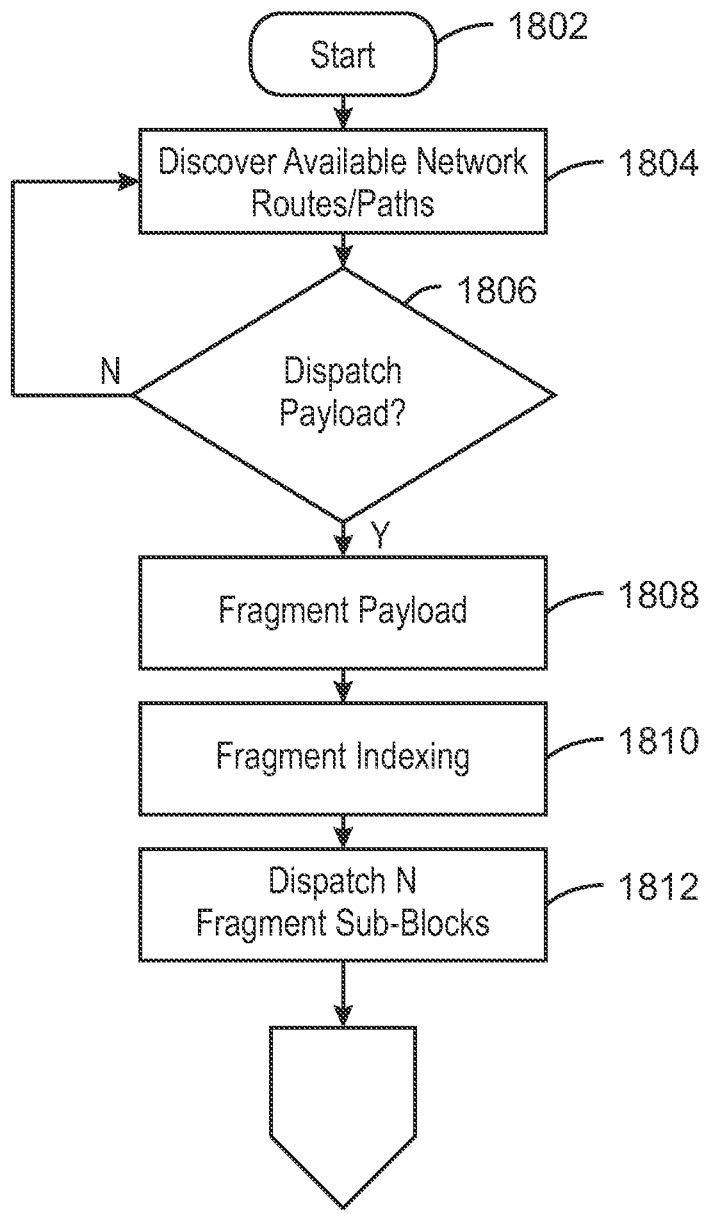
FIG. 18 is a process flow diagram of an example method for fragmenting and dispatching a payload over multiple parallel communication channels in accordance with some embodiments.

FIG. 18 is a process flow diagram of an example method 1800 for fragmenting and dispatching a payload over multiple parallel communication channels in accordance with some embodiments. The method 1800 of FIG. 18 may be implemented by the IoT device 2000 described with respect to FIG. 20. The method 1800 starts at block 1802, for example, when a data payload is ready for transmission.

At block 1804, the available network routes and associated protocols are discovered. These may be saved in a library in the IoT device, and periodically tested to confirm that connectivity is still present. The information discovered may also include data on allowed payload sizes for the supported protocols, transmission speeds, and the like.

At block 1806, a determination is made as to whether to dispatch a payload. This may be performed when a payload is ready and connectivity to one or more networks is present.

At block 1808, the payload is fragmented, for example, based on the available network routes and the maximum available payload sizes supported by the associated protocols. The fragmentation may account for other parameters of the communication channels, such as transmission rates, priority, and the like. The fragmentation may form the sub-blocks 1404 described with respect to FIGS. 13-17.

At block 1810, the fragments are indexed. This may be performed by assigning sequence numbers to the fragments, then constructing fragment headers that include the sequence numbers. The fragments are concatenated with the headers to form the sub-blocks. The individual sub-blocks may then be packaged into the protocol frames for the transmission over the different routes, for example, as described with respect to FIGS. 8-12. At block 1812, the sub-blocks or fragments of the payload are dispatched along the different transmission routes.

Figure 19:
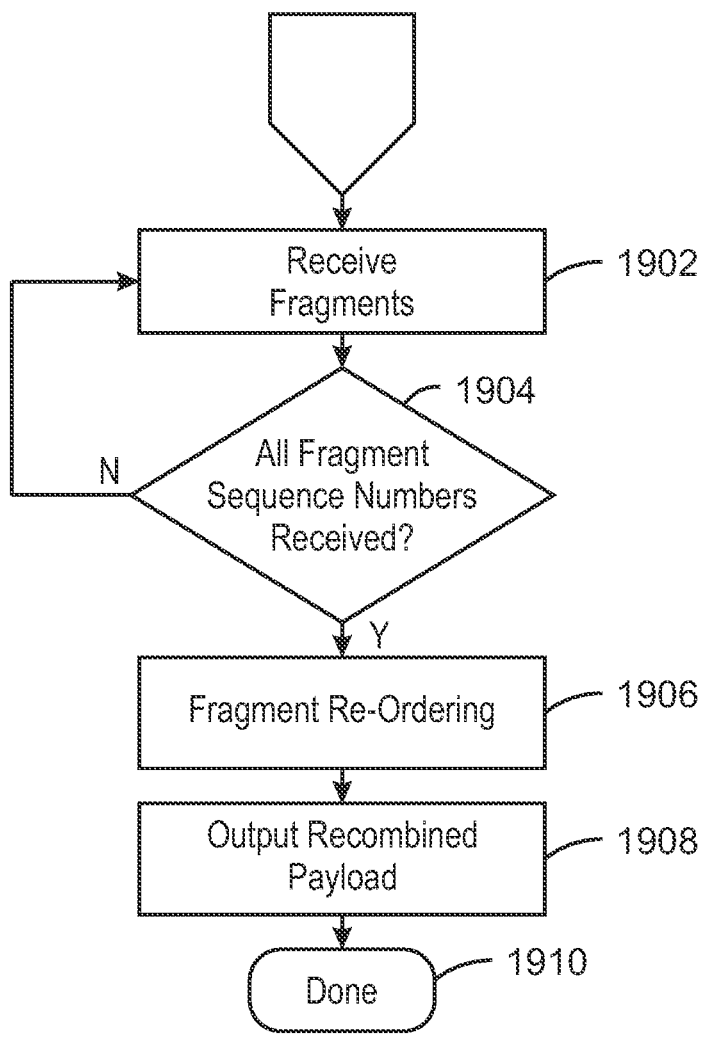
FIG. 19 is a process flow diagram of an example method for receiving and recombining packets sent using an NDM technique in accordance with some embodiments.

FIG. 19 is a process flow diagram of an example method 1900 for receiving and recombining packets sent using an NDM technique in accordance with some embodiments. The method 1900 of FIG. 19 may be implemented by the IoT device 2000 described with respect to FIG. 20. The method 1900 starts at block 1902 as fragments are received from a sending device over a number of different communications channels.

This may be performed by detecting the receipt of frames on a number of different routes and in a number of different protocols. If the frames are packaged in different protocols, the payload is removed from the protocol frame and analyzed. The analysis parses the frame and strips the header. The fragment of the payload is pushed to a local memory store and the sequence number is recorded.

At block 1904, a determination is made as to whether all of the fragments have been received. If not, process flow returns to block 1902 to continue waiting for fragments. The IoT device may not need to wait for all fragments to be received before starting to assemble the data. For example, a command in one of the fragments could indicate that a missing fragment contains less important data and should not stop reassembly.

At block 1906, the fragments may be reordered and combined. For example, each fragment may be appended by sequence number and length to the reassembled data payload to form the received data payload. At block 1908, the recombined payload is output, for example, to the consumer process.

Figure 20:
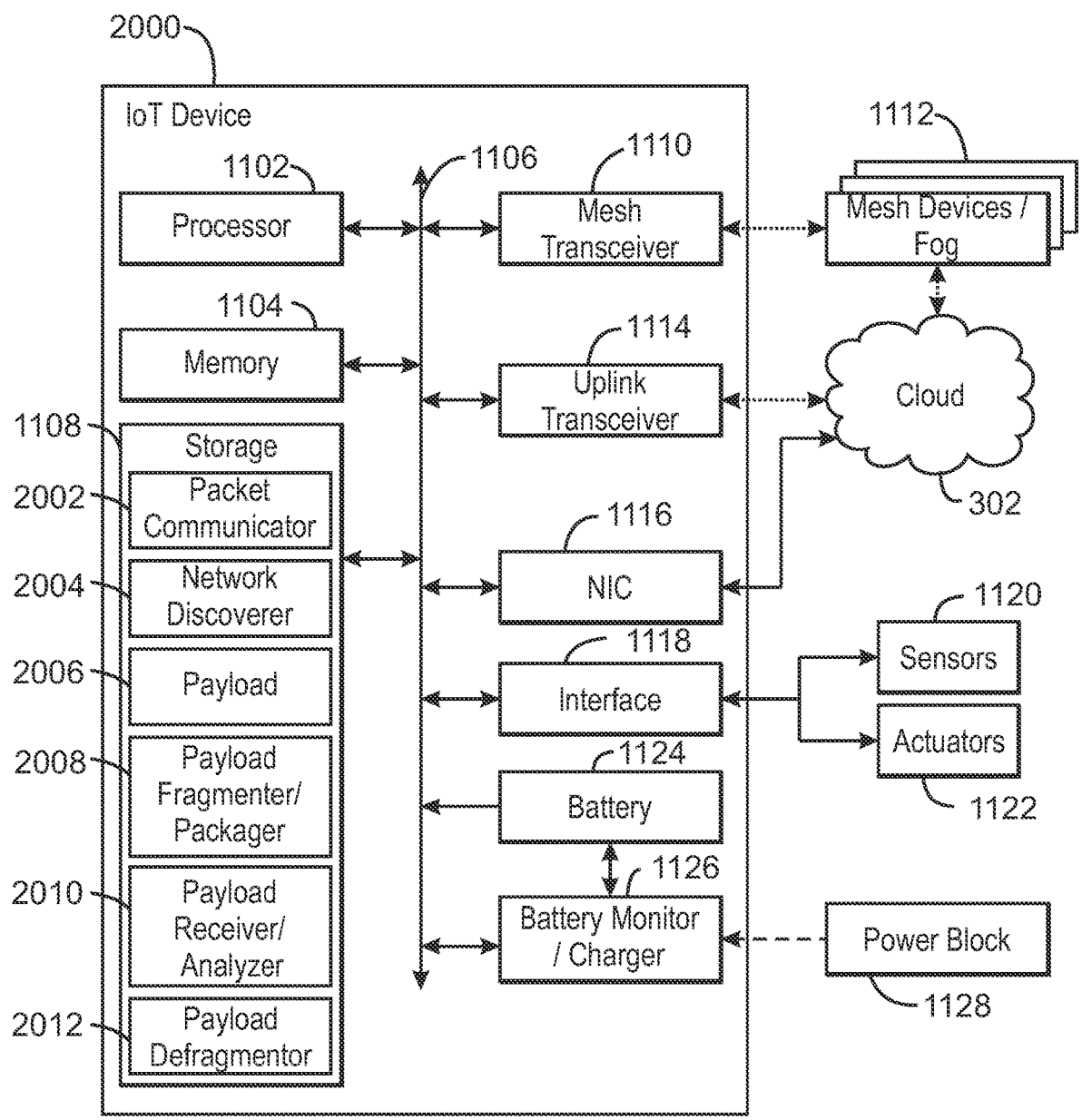
FIG. 20 is a block diagram of an example of components that may be present in an IoT device for fragmenting payloads for transmission along multiple parallel paths in accordance with some embodiments.

FIG. 20 is a block diagram of an example of components that may be present in an IoT device 2000 for fragmenting payloads for transmission along multiple parallel paths in accordance with some embodiments. Like numbered items are as described with respect to FIG. 3. It can be noted that different components may be selected and used for the IoT device 2000 than for those selected for the IoT device 1100 discussed with respect to FIG. 11, and other IoT devices discussed herein.

The mass storage 1108 may include a number of modules to implement the coalition group formation described herein. Although shown as code blocks in the mass storage 1108, it may be understood that any of the modules may be fully or partially replaced with hardwired circuits, for example, built into an application specific integrated circuit (ASIC).

The mass storage 1108 may include a communicator 2002 that sends receives frames from mesh devices 1112 or devices in the cloud 302 over one more communications links, for example, through a mesh transceiver 1110, an uplink transceiver 1114, and a NIC 1116, among others. In addition to the functions described with respect to FIG. 20, the communicator 2002 may perform other functions, such as translation of frames between protocols, packaging frames in other protocols, performing proof-of-provenance additions, and the like. Further, the communicator 2002 may be part of an easement system.

The communicator 2002 may be used by a network discoverer 2004 to identify available networks and protocols for communications between the IoT device 2000 and a target device. The network discoverer 2004 may build and maintain a list of available network communication paths and protocols to be used for parallel NDM communications.

A payload 2006 may be built by the IoT device 2000, for example, from measurements obtained from the sensors 1120. In some examples, the payload 2006 may be passed from another IoT device in the mesh device 1112, such as a more remote device. In this example, the IoT device 2000 may be operating as a gateway to pass communications, including the payload, on to other devices.

A payload fragmenter/packager 2008 may analyze the payload and available communications channels to determine the channel combinations likely to result in an optimum communication of the payload, based on speed of communications, reliability, power availability, or any number of other factors and combinations of factors. The payload fragmenter/packager 2008 may then fragment the payload into sub-objects for transmission. Headers and other identifying and sequence information may be appended for the transmission. Depending on the communications selected, the sub-objects may be packaged into the data fields of various protocol frames, then sent over the selected communications channels by the communicator 2002.

In some aspects, the communications may be bidirectional. A payload receiver/analyzer 2010 may receive frames from other devices, remove protocol packaging, and analyze the frames to identify message and sequence information. The payload receiver/analyzer 2010 may determine that the data fields of received frames are sub-objects of payloads. The payload receiver/analyzer 2010 may store the sub-objects and sequence numbers until various conditions are met, then pass the sequence numbers and storage information on to a payload defragmenter 2012. The conditions may include a determination that all sub-objects in a payload have been received, or a determination that any missing sub-objects in a sequence include less important data and assembly should proceed.

The payload defragmenter 2012 may reassemble the payloads into the final payload object, for example, as discussed in FIG. 19. The payload may then be used by the IoT device 2000, or sent on to a data consumer.

Figure 21:
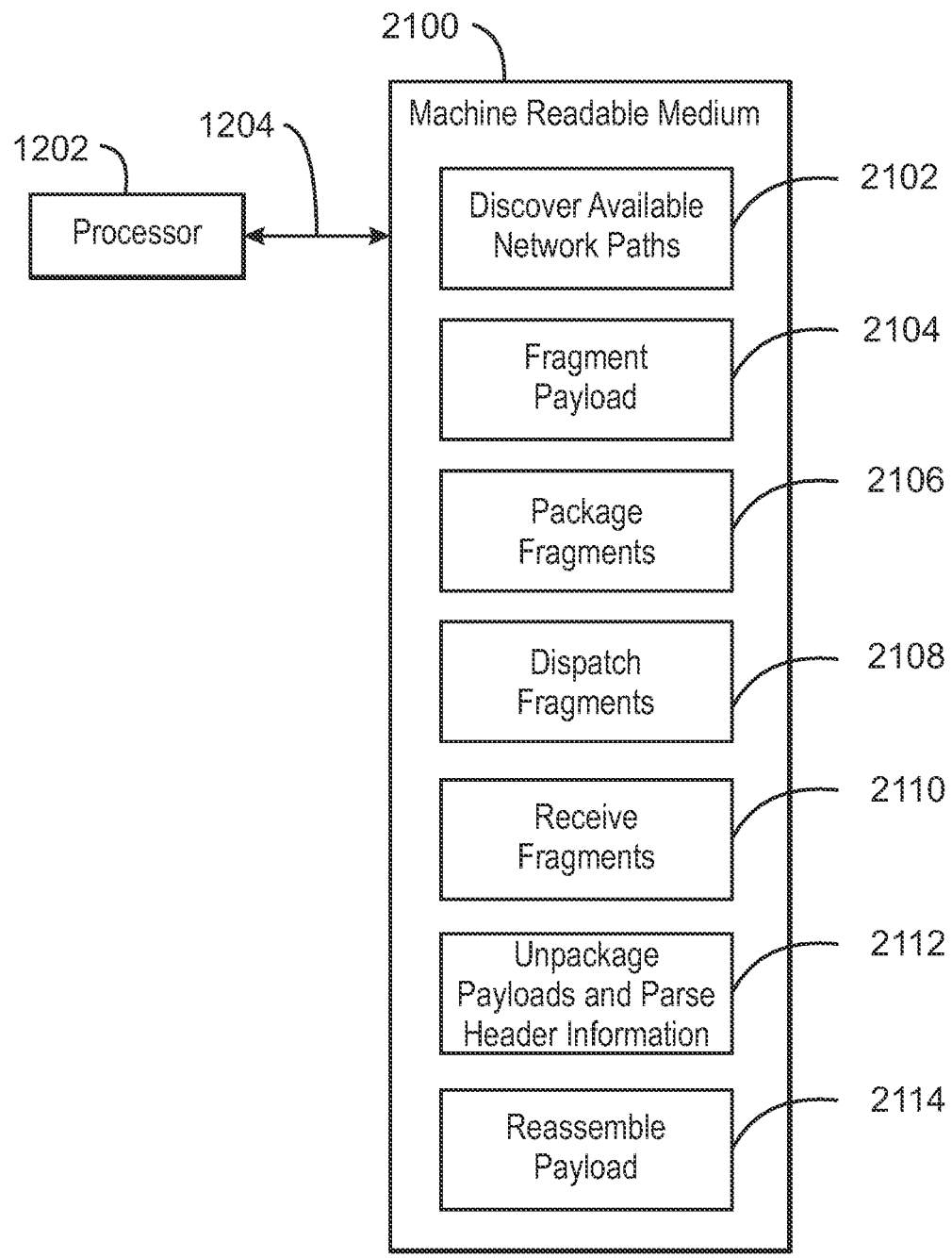
FIG. 21 is a block diagram of a non-transitory, machine readable medium including code to direct a processor to fragment and transmit payloads along multiple parallel paths in accordance with some embodiments.

FIG. 21 is a block diagram of a non-transitory, machine readable medium 2100 including code to direct a processor 1202 to fragment and transmit payloads along multiple parallel paths in accordance with some embodiments. The processor 1202 may access the non-transitory, machine readable medium 2100 over a bus 1204. The processor 1202 and bus 1204 may be implemented in a manner similar to the processor 1202 and bus 1204 described with respect to FIG. 12. The non-transitory, machine readable medium 2100 may include devices described for the mass storage 1108 of FIG. 11 or may include optical disks, thumb drives, or any number of other hardware devices.

The non-transitory, machine readable medium 2100 may include code 2102 to direct the processor 1202 to discover available network paths and protocols to a receiving device. Code 2104 may be included to direct the processor 1202 to fragment a payload to fit into the data fields of frames for the protocols selected for the communications. The code 2104 may direct the processor 1202 to append header information that includes the sequence number of the packet, among other information. Code 2106 may be included to direct the processor 1202 to package the fragments into different protocol frames, depending on the selected communications. Code 2108 may be included to direct the processor 1202 to dispatch the frames in the direction of the target device over the different communication channels selected.

Code 2110 may be included to direct the processor 1202 to receive the fragments, for example, in frames of different protocols. Code 2112 may be included to unpackage the payloads from the different protocol frames, then to parse the header information to identify a payload and sequence number. The code 2112 may instruct the processor 1202 to determine when the reassembly of the payload should be attempted, for example, before all fragments have been received. Code 2114 may be included to direct the processor to reassemble the payload based on the sequence number.

The communications techniques described above may be used to enable or enhance communications with remotely located IoT devices, for example, weather sensors, industrial units, and the like. Position determinations for these devices may be an issue, especially in networks that have battery powered units. Techniques that allow devices to determine their position from information communicated from other devices in a mesh network may allow at least a portion of the devices to conserve power.

Mesh networks are useful in environments where an actor may want access to data with very low latency or when the data might be tightly coupled in a temporal spatial fashion. Using the example of a traffic intersection, as discussed with respect to FIG. 4, data exchange at the intersections may occur at very high volume, velocity, and variety between road users such as vehicles, pedestrians, cyclists, and traffic lights or other roadside units. The environment of the intersection may be particularly challenging with fast moving vehicular traffic, minimal fixed infrastructure, and signal propagation conditions that may be difficult.

One approach to improving performance and improve latency is to perform network data storage and content delivery at the very edge of the network. This may include caching data requiring very fast access in devices capable of holding the data and are close to applications needing the data.

An intersection may use a number of applications for traffic control and other purposes. The applications may include collision prevention systems, emergency services, modification of operations based on environmental data, retail and advertising services, among others. A good deal of that data is temporally and spatially dependent. For example, a traffic jam the data is tightly coupled to the location and the time. Moreover, the data is often intended to be consumed by proximate groups, such as traffic control systems, vehicles, cyclists, pedestrians, police, emergency services, and the like.

Due to IP address determination, framing, handshaking, and other communications requirements, IP based technologies may perform poorly in environments in which contact time between devices may be very low. Data semantics, and other technologies described herein, may provide a means to simplify accessing and using data. The technologies may enable users of data to access the data from devices in close proximity. Vehicles may also act as mules to move data, for example, between different intersections and systems. One technique that may be used for these types of communication is the use of distributed hash tables to describe, store, and publish data in a network.

Figure 22:
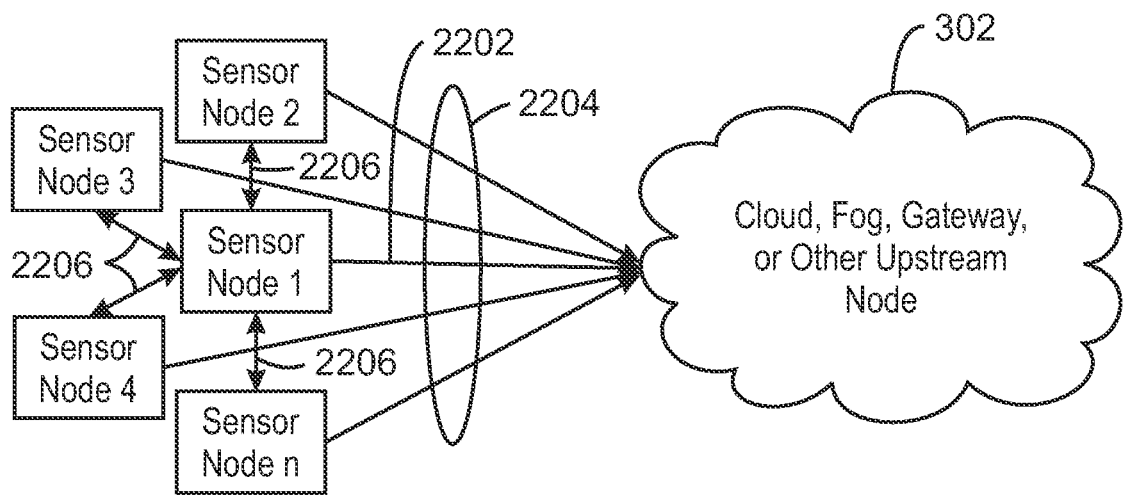
FIG. 22 is a schematic diagram of the ad-hoc formation of a reverse distributed hash table (DHT) network for IoT services in accordance with some embodiments.

FIG. 22 is a schematic diagram 2200 of the ad-hoc formation of a reverse distributed hash table (DHT) network for IoT services in accordance with some embodiments. The IoT services may include the sending or storage of data. DHT networks may be formed by the generation of a unique hash to describe, or publish a file within a network as fragments sent to various nodes. Nodes that have received fragments of the file become the source of new copies of the file. Nodes wishing to access that file download file fragments from other nodes until they have the complete file. As nodes begin to receive fragments of the file, then can share, or seed, those fragments onto other nodes that wish to acquire the file. This creates an ad-hoc network with no central control which is capable of distributing many copies of a file throughout the peers in a network and enabling new peers to acquire the files quickly as they download fragments from many sources, instead of one source.

In some aspects, a reverse version of this may also be applied to data transmission to lower the probability of data loss during events. In this example, a sensor node, such as node 1 in the diagram, detects an event storm which is generating a high volume of data. The event storm may correspond to an emergency event, a high traffic flow in an intersection, an increased period of data collection, and the like. Node 1 proceeds to send the data to the cloud 302, or to a fog node, a gateway or some other upstream data sink over a first communication channel 2202. However, the first communication channel 2202 has limited network bandwidth and quickly becomes congested, forcing a backlog of messages to queue up on node 1. The queue may take a significant period of time to be cleared, delaying messages to the destination, or even causing the loss of data if the queue overflows.

However, in the techniques used for a reverse DHT network, node 1 may use the network capacity of its neighboring nodes to send the excess message load to the same end destination. Node 1 may discover the neighboring nodes 1 . . . n, for example, over uncongested network links 2206. Various techniques may be used for the peer discovery, including mesh networking protocols, such as the specifications from the Openfog consortium, the Alljoyn specification, and others including various open source ad-hoc networking protocols. Further, the IP protocols for IPv6 include native support for peer discovery, as do other networking protocols.

The uncongested network links 2206 may include any number of network links, such as Wi-Fi, or Bluetooth, among others. In some example, as described with respect to FIG. 3, the nodes may be coupled by a wired network, while each individual node may also have a wireless link to a gateway. Physically proximate nodes may have higher bandwidth connections than remote ones, thus, a congested node can send file fragments to surrounding peers and have them route the messages to their destination.

The data sink, in this example, located in the cloud 302 may acknowledge the received messages to the node which sent it, for example, if node 2 sends a portion of the data to the data sink, the data sink may acknowledge receipt to node 2. Node 2 would then acknowledge the receipt of the data by the data sink to node 1, the data source. Once node 1 receives an acknowledgement message (ACK) from any source, such as node 2 or other peers, on the delivery of a particular message, it may consider the message delivered and remove it from the queue.

The rate at which the ACKs are received back by the data source may allow flow control. For example, if node 2 is sending an acknowledgement every second and node 3 is sending an acknowledgement every two seconds, it would indicate that node 2 is able to handle a higher message load, and thus node 1 would adjust its operation to send more messages to node 2 than to node 3.

The source sensor node, or node 1 in the example, may track the message flow and implement mechanisms to allow for peers failing to deliver a message. For example, if a peer node, such as node 4, does not return an ACK for a message it is sent, the source node may stop routing messages to it for a configurable period of time. Further, any messages sent to node 4 may be considered lost and may be resent through other peers or directly from the sensor node to the device in the cloud 302.

Figure 23:
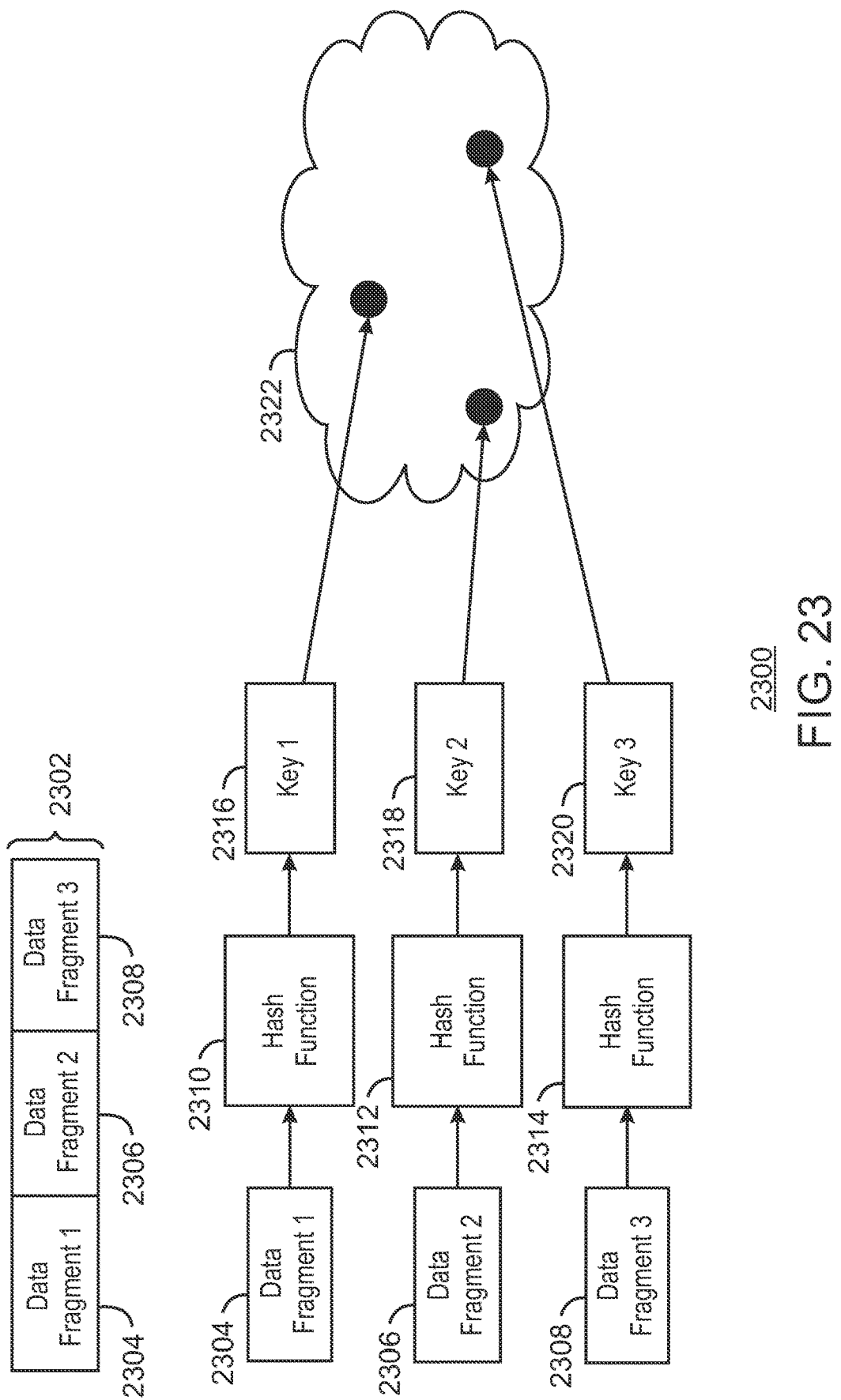
FIG. 23 is a schematic diagram of a process for tracking which nodes may be used for storing or transmitting file data in accordance with some embodiments.

FIG. 23 is a schematic diagram 2300 of a process for tracking which nodes may be used for storing or transmitting file data 2302 in accordance with some embodiments. The file data 2302 may be broken into fragments 2304-2308. A hash function 2310-2314 may be performed on each of the fragments 2304-2308 to generate a key 2316-2320. The key 2316-9720 may then be used to determine which node should be used to store or send a data fragment in a dispersed mesh 2322 of nodes.

Figure 24:
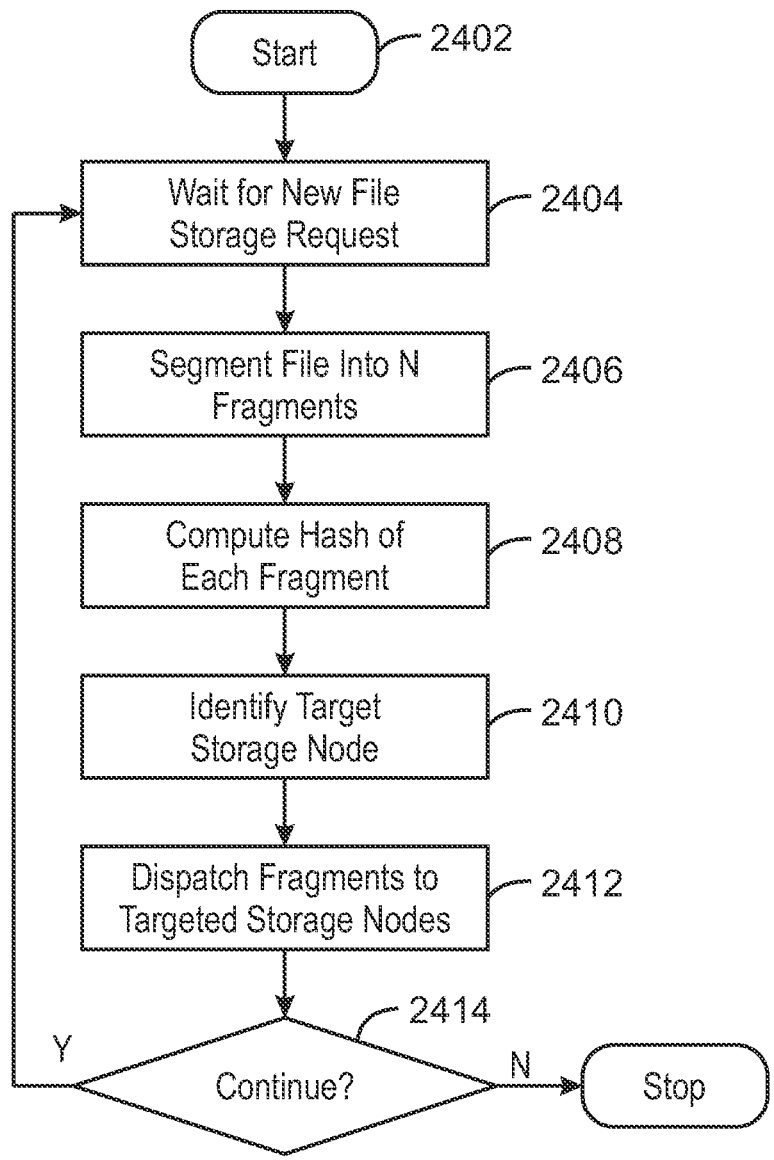
FIG. 24 is a process flow diagram of an example method for targeting storage or sending nodes in accordance with some embodiments.

FIG. 24 is a process flow diagram of an example method 2400 for targeting storage or sending nodes in accordance with some embodiments. The method 2400 of FIG. 24 may be implemented by the IoT device 2600 described with respect to FIG. 26. The block 2402 represents, for example, when a node generates a file for storage or transmission. At block 2404, a new file storage or transmission request is generated for the file. At block 2406, the file is fragmented into N fragments, depending, for example, on the payload size of packets or frames used to transmit the data. At block 2408, a hash may be computed for each fragment.

At block 2410, the target storage or transmission node for each fragment may be identified. This may be performed by extracting the first M bytes from the hash code of the fragment, where the number, M, may be determined by the length of node IDs used in the mesh network. The bytes from the hash may then be used to determine a target node by identifying the target node as a closest match between the first M bytes of the node ID and first M bytes of the file fragment hash. The node ID may then form a part of the file address table. Knowing the node ID, a determination may be made as to the range of file fragments that it is responsible for saving or transmitting. For nodes with closely matching IDs, the technique may build in redundancy in cases where node availability is not guaranteed, such as in volatile network environments. At block 2412, the fragment is sent to the target storage or transmission node, packaged in a packet or frame.

At block 2414, a determination is made as to whether to continue the process. The process may end when the data storage is finished, or may wait until ACKs are received for all fragments being sent by other nodes.

Figure 25:
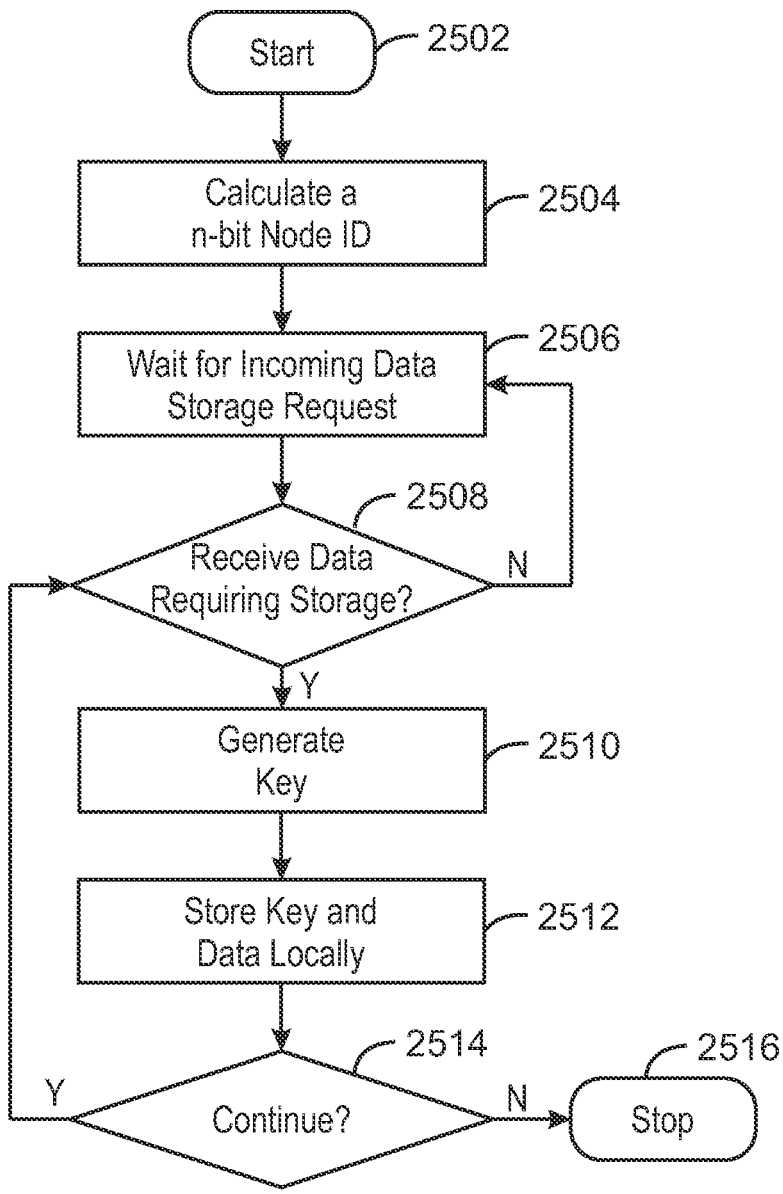
FIG. 25 is a process flow diagram of an example method for storing or transmitting data using a distributed hash table (DHT) in accordance with some embodiments.

FIG. 25 is a process flow diagram of an example method 2500 for storing or transmitting data using a distributed hash table (DHT) in accordance with some embodiments. The method 2500 of FIG. 25 may be implemented by the IoT device 2600 described with respect to FIG. 26. The block 2502 represents, for example, when device is powered and joins an ad-hoc network. At block 2504, a node ID of n-bits in length is calculated or obtained. This may be an ID assigned from a blockchain, as described herein, an ID assigned by a manufacturer, or an ID calculated from a random number generator, among others.

At block 2506, a wait period for an incoming storage or transmission request is implemented. Once the wait period is completed, at block 2508 a determination is made as to whether data has been received for storage or transmission. If not, process flow returns to block 2506 for another wait period.

If data has been received at block 2508, at block 2510, a key is generated for the data received. This may be performed by calculating a hash function for the data received.

At block 2512, the key and the data are stored locally or transmitted. This may be performed by storing or transmitting the data in the node, then prepending the node ID to the key. The resulting key may be stored in a local store, for example, in a list, a table, a queue, or a database, among other data structures.

At block 2514, a determination is made as to whether to continue the process. This may be based on a determination as to whether more data is expected for the current sequence. If so, process flow returns to block 2508 to determine if data has been received for storage or transmission. If not, the process ends at block 2516.

Figure 26:
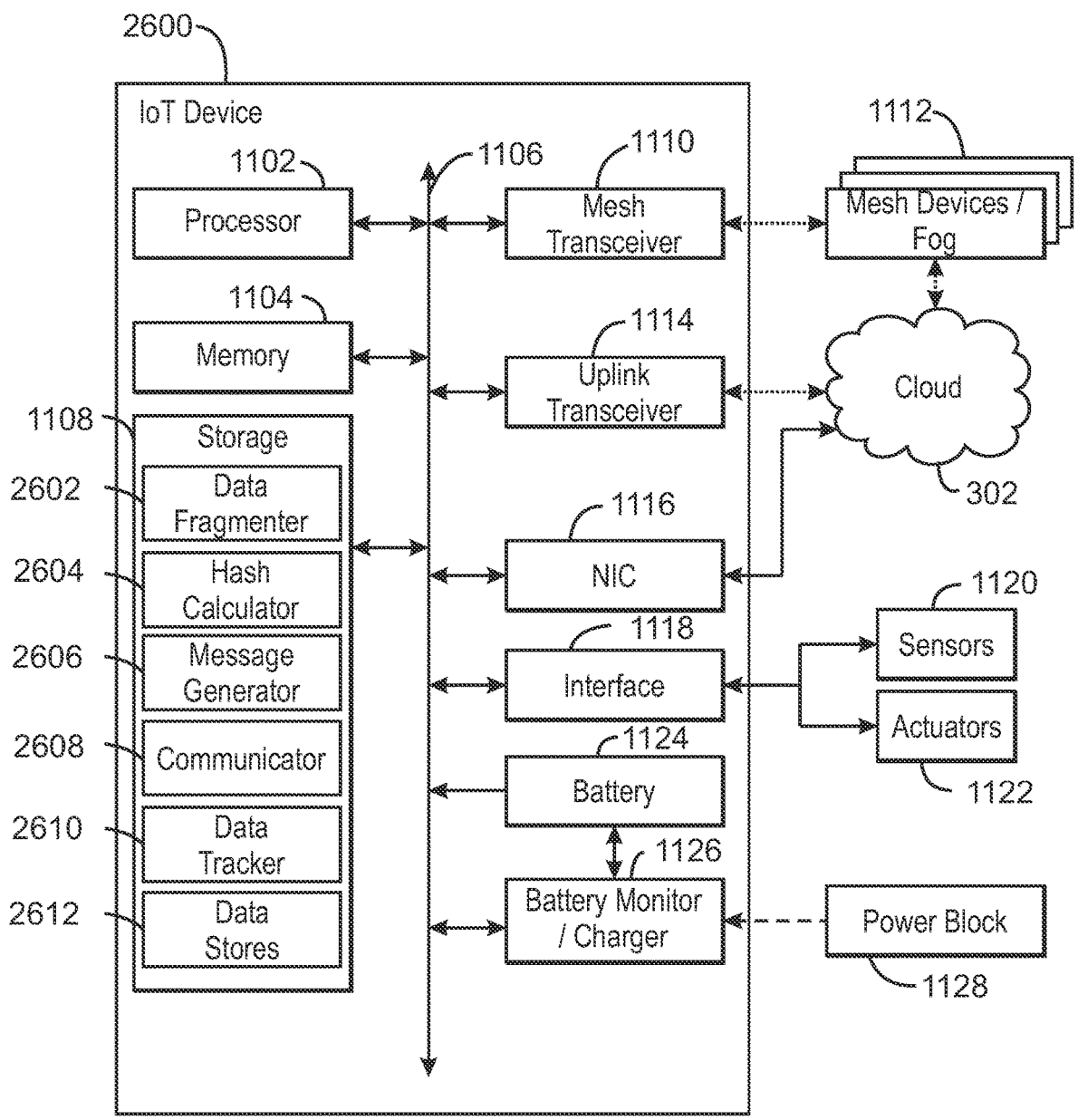
FIG. 26 is a block diagram of an example of components that may be present in an IoT device for coordinating or fulfilling service requests in accordance with some embodiments.

FIG. 26 is a block diagram of an example of components that may be present in an IoT device 2600 for coordinating or fulfilling service requests in accordance with some embodiments. Like numbered items are as described with respect to FIGS. 3 and 11. It can be noted that different components may be selected and used for the IoT device 2600 than for those selected for the IoT device 1100 discussed with respect to FIG. 11, and other IoT devices discussed herein. The other nodes may include mesh devices 1112, devices in the cloud 302, or both.

The mass storage 1108 may include a number of modules to implement the coalition group formation described herein. Although shown as code blocks in the mass storage 1108, it may be understood that any of the modules may be fully or partially replaced with hardwired circuits, for example, built into an application specific integrated circuit (ASIC). The mass storage 1108 may include a data fragmenter 2602 to fragment a data file to fit within the payload field of packets or frames. A hash calculator 2604 may calculate hash keys to identify storage or transmission nodes for the data.

A message generator 2606 may use the hash keys to determine node IDs for storage or transmission of the data. The message generator 2606 may also format a data fragment for sending it to another node for storage or transmission, for example, packaging the data fragment in a payload field of a packet or frame.

A communicator 2608 may send the packaged data fragment to another node for storage or transmission. For transmission, the communicator 2608 may also receive an acknowledgement from another node, such as a mesh device 1112, and determine if the acknowledgment was from an upstream destination, such as a device in the cloud 302. A data tracker 2610 may use the acknowledgments to determine whether data has been sent to the target device from the sending node, or needs to be resent. The data tracker 2610 may also implement flow control, for example, based on the rate of acknowledgments coming in from other nodes. For storage, a data store 2612 may save a key with the location and identity of a data fragment. The key may prepend the hash code for the fragment to the ID of the node, or mesh device 1112, holding the stored data.

Figure 27:
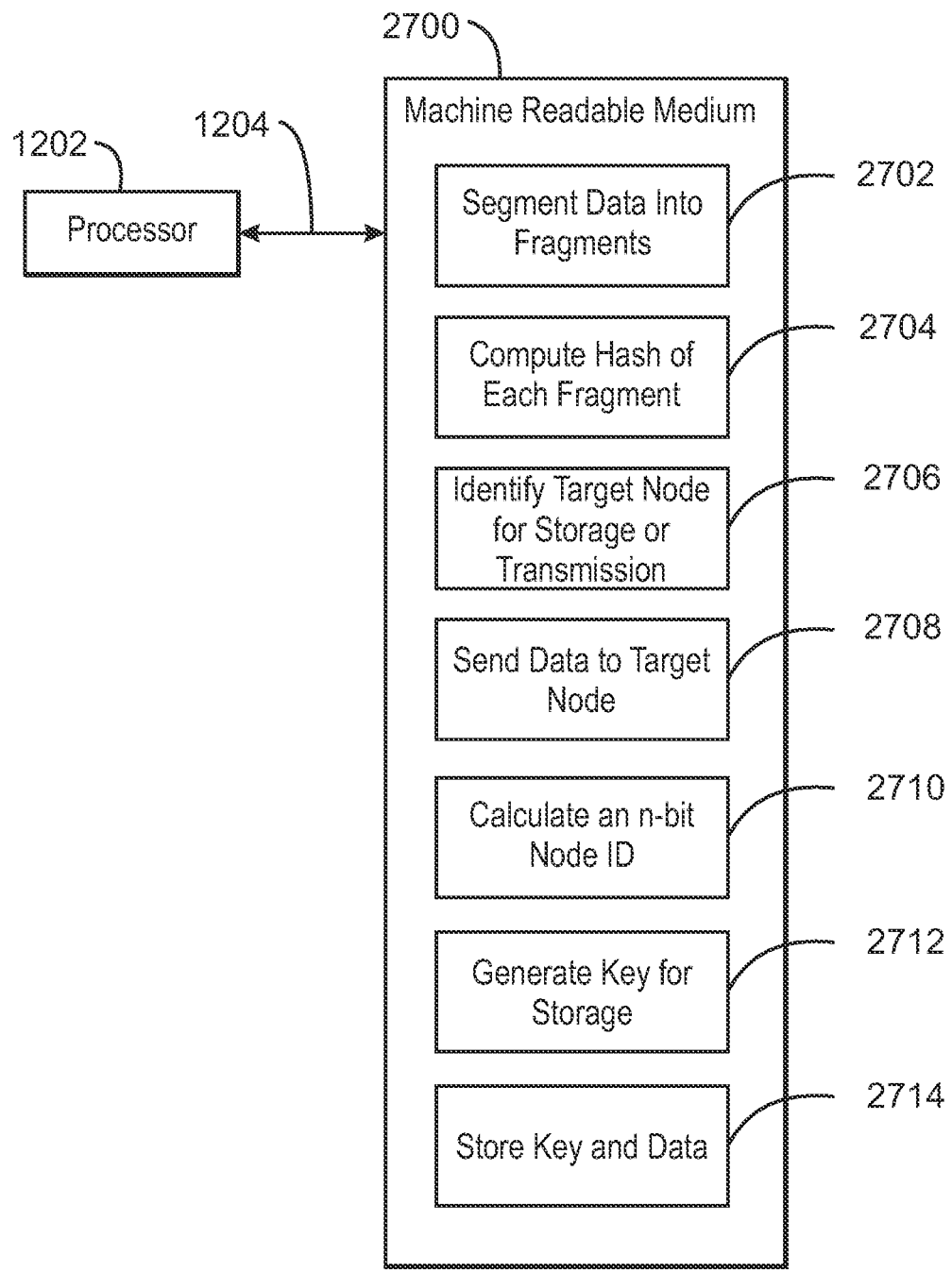
FIG. 27 is a block diagram of a non-transitory, machine readable medium including code to direct a processor, or processors, to coordinate or fulfill service requests in accordance with some embodiments.

FIG. 27 is a block diagram of an exemplary non-transitory, machine readable medium 2700 including code to direct a processor 1202, or processors, to coordinate or fulfill service requests in accordance with some embodiments. Like numbered items are as described with respect to FIG. 12. The processor 1202 may access the non-transitory, machine readable medium 2700 over a bus 1204. The non-transitory, machine readable medium 2700 may include devices described for the mass storage 1108 of FIG. 11 or may include optical disks, thumb drives, or any number of other hardware devices.

The non-transitory, machine readable medium 2700 may include code 2702 to direct the processor 1202 to segment a file into fragments. Code 2704 may be included to direct the processor 1202 to compute a hash code for each fragment. Code 2706 may be included to direct the processor 1202 to identify the target storage or transmission node for each fragment. Code 2708 may be included to direct the processor 1202 to send a data fragment to a target node. Code 2710 may be included to direct the processor 1202 to calculate a node ID. Code 2712 may be included to direct the processor 1202 to generate a key for storage. Code 2714 may be included to direct the processor 1202 to store the key and hash.

The communications by the different nodes do not have to be over the same types of communication channels. Different communication routes, frequencies, and the like, may be used depending on the application requirements.

Example 1 includes an apparatus. The apparatus includes an Internet-of-Things (IoT) network, wherein the IoT network includes an IoT device. This includes a communicator to send a communication including an egress frame, a protocol library builder to determine what protocols are available, a frame analyzer to analyze an ingress frame, and a frame builder to build the egress frame from the ingress frame.

Example 2 includes the subject matter of example 1. In example 2, the frame analyzer is to determine frame length for the ingress frame, a protocol for an egress frame, or both.

Example 3 includes the subject matter of either of examples 1 or 2. In example 3, the apparatus includes an easement system.

Example 4 includes the subject matter of any of examples 1 to 3. In example 4, the apparatus includes a protocol library to store available protocols.

Example 5 includes the subject matter of any of examples 1 to 4. In example 5, the protocol library includes formatting data for protocols including payload size, field length, frame header format, or frame footer format, or any combinations thereof.

Example 6 includes the subject matter of any of examples 1 to 5. In example 6, the apparatus includes the ingress frame in a first protocol, and the egress frame in a second protocol, wherein the egress frame includes a payload field including at least a portion of the ingress frame.

Example 7 includes the subject matter of any of examples 1 to 6. In example 7, the apparatus includes the ingress frame in a first protocol, and a plurality of egress frames, each in a second protocol, wherein each of the plurality of egress frames includes a payload field including at least a portion of the ingress frame.

Example 8 includes a method for packing a frame in a first protocol into a payload field of a second protocol. The method for packing a frame in a first protocol into a payload field of a second protocol includes identifying a protocol for an ingress frame and a protocol for an egress frame, writing at least a portion of the ingress frame into the payload field of the egress frame, and dispatching the egress frame towards the destination Example 9 includes the subject matter of example 8. In example 9, the method includes creating a library of available ingress and egress protocol, wherein the library includes the size of a frame in each protocol, the payload field size of a frame in each protocol, the addresses for each protocol, or any combinations thereof.

Example 10 includes the subject matter of either of examples 8 or 9. In example 10, the method includes determining the size of the payload field in the egress frame, and determining if the ingress frame will fit within the payload.

Example 11 includes the subject matter of any of examples 8 to 10. In example 11, the method includes fragmenting an ingress frame that is too large to fit in a payload field of an egress frame.

Example 12 includes the subject matter of any of examples 8 to 11. In example 12, the method includes splitting the ingress frame into a plurality of byte sequences, wherein each byte sequence will fit in a payload field of an egress frame.

Example 13 includes the subject matter of any of examples 8 to 12. In example 13, the method includes writing each of the plurality of byte sequences into the data field of a separate egress frame, and writing a sequence number for each of the plurality of byte sequences into the data filed of the separate egress frame.

Example 14 includes the subject matter of any of examples 11 to 13. In example 14, the method includes determining if all fragments of the ingress frame have been processed, and, if not, continuing to write fragments into egress frames.

Example 15 includes the subject matter of any of examples 8 to 14. In example 15, the method includes determining if a new ingress frame has been received, and processing the new ingress frame to package it into an egress frame.

Example 16 includes a non-transitory, machine readable medium. The non-transitory, machine readable medium includes instructions that, when executed, direct a processor to analyze an ingress frame to determine size and other constraints, determine a protocol for an egress frame, write at least a portion of the ingress frame into the data field of the egress frame, and route the egress frame towards a destination.

Example 17 includes the subject matter of example 16. In example 17, the non-transitory, machine readable medium includes instructions that, when executed, direct the processor to create an inventory of available ingress protocols and egress protocols.

Example 18 includes the subject matter of either of examples 16 or 17. In example 18, the non-transitory, machine readable medium includes instructions that, when executed, direct the processor to fragment the ingress frame if it is too large to fit within the data field of the egress frame.

Example 19 includes the subject matter of any of examples 16 to 18. In example 19, the non-transitory, machine readable medium includes instructions that, when executed, direct the processor to label each fragment with a sequence number for correct reassembly at a destination.

Example 20 includes the subject matter of any of examples 16 to 19. In example 20, the non-transitory, machine readable medium includes instructions that, when executed, direct the processor to place the ingress frame, or a fragment of the ingress frame, in the payload field of the egress frame.

Example 21 includes the subject matter of any of examples 16 to 20. In example 21, the non-transitory, machine readable medium includes instructions, that, when executed, direct the processor to send the frame on to a subsequent device with an address indicating the final destination.

Example 22 includes an apparatus. The apparatus includes an Internet-of-Things (IoT) network, wherein the IoT network includes an IoT device. The IoT device includes a network discoverer to identify available parallel communication channels between the IoT device and a target device. a payload, a payload fragmenter/packager to fragment the payload into sub-objects for transmission, and a packet communicator to send the sub-objects to the target device over the parallel communication channels.

Example 23 includes the subject matter of examples 22. In example 23, the network discoverer is to determine a combination of the communication channels.

Example 24 includes the subject matter of either of examples 22 or 23. In example 24, the network discoverer is to base, at least in part, the determination of the communication channels on speed of communications, reliability, or power availability, or combinations thereof.

Example 25 includes the subject matter of any of examples 22 to 24. In example 25, the payload includes measurements obtained from a sensor.

Example 26 includes the subject matter of any of examples 22 to 25. In example 26, the payload includes a message from another IoT device.

Example 27 includes the subject matter of any of examples 22 to 26. In example 27, the network discoverer is to maintain a list of available network communication paths and associated protocols to be used for parallel communications.

Example 28 includes the subject matter of any of examples 22 to 27. In example 28, the payload fragmenter/packager is to package each of the sub-objects into a frame, wherein the frame is in a protocol associated with a communication channel.

Example 29 includes the subject matter of any of examples 22 to 28. In example 29, the apparatus includes a payload receiver/analyzer to receive frames from other devices, to remove protocol packaging, and to analyze the frames to identify message and sequence information Example 30 includes the subject matter of any of examples 22 to 29. In example 30, the payload receiver/analyzer is to determine that the data fields of received frames are sub-objects of payloads.

Example 31 includes the subject matter of any of examples 22 to 30. In example 31, the payload receiver/analyzer is to store the sub-objects and sequence numbers all sub-objects have been received, then pass the sequence numbers and storage information on to a payload defragmenter.

Example 32 includes the subject matter of any of examples 22 to 31. In example 32, the apparatus includes a payload defragmenter to reassemble the payloads into the final payload object.

Example 33 includes a method for fragmenting and dispatching a payload over multiple parallel communication channels. The method for fragmenting and dispatching a payload over multiple parallel communication channels includes fragmenting the payload into fragments based, at least in part, on available communication channels and payload sizes supported by protocol frames associated with the communication channels. The method also includes assigning sequence numbers to the fragments, appending headers including the sequence numbers to the fragments to form sub-blocks, packaging the sub-blocks into the protocol frames for the transmission over the different routes, and dispatching the sub-blocks over the different communication channels.

Example 34 includes the subject matter of example 33. In example 34, fragmenting the payload into fragments is based on, at least in part, transmission rates over communication channels, or priority over communication channels, or both.

Example 35 includes the subject matter of either of examples 33 or 34. In example 35, the method includes discovering the available communication channels to a destination, and saving the communication channels and associated protocols to a library.

Example 36 includes the subject matter of any of examples 33 to 35. In example 36, the method includes testing the communication channels on a periodic basis to confirm that connectivity is still present.

Example 37 includes a method for receiving and recombining packets sent over multiple parallel communications channels. The method for receiving and recombining packets sent over multiple parallel communications channels includes receiving frames from a sending device over a number of different communications channels, parsing the frames to obtain fragments of a payload, determining when to reassemble the payload from the fragments, and combining the fragments to reassemble the payload.

Example 38 includes the subject matter of example 37. In example 38, the method includes detecting the receipt of frames on a number of different communication channels, removing the payloads from the frames, analyzing the payloads to identify payload fragments and associated sequence numbers, and storing the payload fragments and recording the associated sequence numbers.

Example 39 includes the subject matter of either of examples 37 or 38. In example 39, the method includes combining the fragments before all frames are received to obtain a partial payload.

Example 40 includes the subject matter of any of examples 37 to 39. In example 40, the method includes providing the payload to a consumer process.

Example 41 includes a non-transitory, machine readable medium. The non-transitory, machine readable medium includes instructions that, when executed, direct a processor to fragment a payload to fit into the data fields of frames for the protocols selected for the communications, append a header to each fragment that includes the sequence number of the fragment to form a sub-block, package each sub-block into a protocol frame, depending on the communication channel, and dispatch each of the protocol frames to the target device over the communication channel associated with the protocol frame.

Example 42 includes the subject matter of example 41. In example 42, the non-transitory, machine readable medium includes instructions that, when executed, direct the processor to discover available communication channels to a receiving device.

Example 43 includes the subject matter of either of examples 41 or 42. In example 43, the non-transitory, machine readable medium includes instructions that, when executed, direct the processor to receive the protocol frames, unpackage the sub-blocks from the protocol frames, parse the header in each of the sub-blocks to identify the fragment and the sequence number of the fragment, and direct the processor to reassemble the payload from the fragments in order of the sequence numbers.

Example 44 includes the subject matter of any of examples 41 to 43. In example 44, the non-transitory, machine readable medium includes instructions that, when executed, direct the processor to determine that the payload should be reassembled before all fragments have been received.

Example 45 includes an apparatus. The apparatus includes an Internet-of-Things (IoT) network, wherein the IoT network includes a plurality of IoT devices. Each IoT device includes a communication channel to an upstream device, a network link to another one of the plurality of IoT devices, a hash calculator to identify a neighbor IoT device, and a communicator to send out a message to the neighbor IoT device.

Example 46 includes the subject matter of example 45. In example 46, the apparatus includes a data fragmenter to fragment a data file into a plurality of payloads.

Example 47 includes the subject matter of either of examples 45 or 46. In example 47, the apparatus includes a message generator to package a payload in a frame to create the message.

Example 48 includes the subject matter of any of examples 45 to 47. In example 48, a communicator in the neighbor IoT device receives the message and sends the message to the upstream device.

Example 49 includes the subject matter of any of examples 45 to 48. In example 49, a message generator in the neighbor IoT device analyzes the message to obtain a payload and stores the payload in a data store.

Example 50 includes the subject matter of any of examples 45 to 49. In example 50, the apparatus includes a data tracker to store an identification for each message sent to a neighbor IoT device in a data store.

Example 51 includes the subject matter of any of examples 45 to 50. In example 51, the identification includes a hash code of a payload in the message and a node ID for the neighbor IoT device.

Example 52 includes the subject matter of any of examples 45 to 51. In example 52, the data tracker is to store an acknowledgement received from a neighbor IoT device that the message has been receive by the upstream device.

Example 53 includes a method for sending data from an internet-of-things (IoT) device to a neighbor IoT device for transmission or storage. The method for sending data from an internet-of-things (IoT) device to a neighbor IoT device for transmission or storage includes segmenting a file into a plurality of fragments, computing a hash code for each fragment, identifying a target node from the hash code, and sending the fragment to the target node.

Example 54 includes the subject matter of example 53. In example 54, identifying the target node includes extracting a selected number of bytes from the hash code, and comparing the selected number of bytes to a node ID for each of a plurality of IoT devices, and identifying the target node by a closest match between the selected number of bytes and a node ID in the plurality of IoT devices.

Example 55 includes the subject matter of either of examples 53 or 54. In example 55, sending the fragment to the target node includes packing the fragment into a payload field in a frame, and transmitting the frame to the target node.

Example 56 includes the subject matter of any of examples 53 to 55. In example 56, the method includes calculating a node ID, and sharing the node ID with neighbor nodes in a plurality of IoT devices.

Example 57 includes the subject matter of any of examples 53 to 56. In example 57, the method includes receiving a frame from a neighbor IoT device, determining that a payload in the frame includes the fragment to be stored, generating a key for the payload using a hash function, and storing data in the node, prepending a node ID to the key to create a data identifier, and storing the data identifier in a local store.

Example 58 includes the subject matter of any of examples 53 to 57. In example 58, the method includes receiving a frame from an IoT device, determining that a payload in the frame includes the fragment to be transmitted to an upstream device, and sending the frame to the upstream device.

Example 59 includes the subject matter of any of examples 53 to 58. In example 59, the method includes extracting the payload from the frame, packaging the payload in a new frame, and transmitting the new frame to the upstream device.

Example 60 includes the subject matter of any of examples 53 to 59. In example 60, the method includes fragmenting the frame into segments, packing the segments into a payload field of each of a plurality of new frames, and transmitting the plurality of new frames to the upstream device.

Example 61 includes the subject matter of any of examples 53 to 60. In example 61, the method includes receiving an acknowledgement of the transmission of the frame from the upstream device, and forwarding the acknowledgment to the IoT device.

Example 62 includes the subject matter of any of examples 53 to 61. In example 62, the method includes monitoring a rate of acknowledgements received at the IoT device from neighbor IoT devices, and controlling a rate of sending frames based, at least in part, on the rate of acknowledgements.

Example 63 includes the subject matter of any of examples 53 to 62. In example 63, the method includes determining that an acknowledgement was not received for a frame sent to a neighbor IoT device, resending the frame to a different neighbor IoT device, and marking the neighbor IoT device as potentially bad.

Example 64 includes a non-transitory, machine readable medium. The non-transitory, machine readable medium includes instructions that, when executed, direct one or more processors to segment data into fragments, compute a hash code for each fragment, identify a target node for a fragment, and send the fragment to the target node.

Example 65 includes the subject matter of example 64. In example 65, the non-transitory, machine readable medium includes instructions that, when executed, direct the one or more processors to compare the hash code to a node ID for a plurality of nodes to identify the target node.

Example 66 includes the subject matter of either of examples 64 or 65. In example 66, the non-transitory, machine readable medium includes instructions that, when executed, direct the one or more processors to calculate a node ID for a node, and share the node ID with a plurality of nodes.

Example 67 includes the subject matter of any of examples 64 to 66. In example 67, the non-transitory, machine readable medium includes instructions that, when executed, direct the one or more processors to receive the fragment, calculate a key for the fragment, and store the key and the fragment.

Example 68 includes the subject matter of any of examples 64 to 67. In example 68, the non-transitory, machine readable medium includes instructions that, when executed, direct the one or more processors to receive the fragment, and transmit the fragment to an upstream device.

Example 69 includes the subject matter of any of examples 64 to 68. In example 69, the non-transitory, machine readable medium includes instructions that, when executed, direct the one or more processors to receive an acknowledgment from the upstream device, and forward the acknowledgment to a device that sent the fragment.

Example 70 includes an apparatus including means to perform a method as in any other Example.

Example 71 includes machine-readable storage including machine-readable instructions, when executed, to implement a method or realize an apparatus as in any other Example.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need to be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus comprising:
   memory;
   programmable circuitry; and
   machine readable instructions to cause the programmable circuitry to at least:
   fragment a data payload into a first portion and a second portion;
   cause first transmission of the first portion to a target device over a first communication channel based on a first network protocol; and
   cause second transmission, at least partially in parallel with the first transmission, of the second portion to the target device over a second communication channel based on a second network protocol, the first network protocol different from the second network protocol, the first network protocol and the second network protocol belonging to a same protocol layer.

2. The apparatus of claim 1, wherein the first portion includes at least one of a first device identifier or a second device identifier, the first device identifier to identify the apparatus, the second device identifier to identify the target device, and the programmable circuitry is to record the at least one of the first device identifier or the second device identifier on a blockchain.

3. The apparatus of claim 1, wherein the first communication channel is associated with a first radio based on a first frequency and the second communication channel is associated with a second radio based on a second frequency.

4. The apparatus of claim 1, wherein the programmable circuitry is to cause the first transmission of the first portion via first network interface circuitry and cause the second transmission of the second portion via second network interface circuitry, and the first network interface circuitry is different from the second network interface circuitry.

5. The apparatus of claim 1, wherein the programmable circuitry is to encapsulate the first portion and the second portion with respective header data, the respective header data including at least one of first data associated with a transit time, second data associated with priority ordering, or third data associated with a retry policy.

6. The apparatus of claim 1, wherein the programmable circuitry is to cause transmission of the first portion over the first communication channel and cause transmission of the second portion over the second communication channel at least partially in parallel.

7. The apparatus of claim 1, wherein the programmable circuitry is to store data associated with the first communication channel and the second communication channel in a datastore, and periodically test the first communication channel and the second communication channel to determine whether connectivity is present.

8. The apparatus of claim 1, wherein the programmable circuitry is to store in a datastore data indicative of a first allowed data payload size for the first communication channel and a second allowed data payload size for the second communication channel.

9. The apparatus of claim 1, wherein the programmable circuitry is to store in a datastore data indicative of a first transmission speed for the first communication channel and a second transmission speed for the second communication channel.

10. At least one storage device or storage disc comprising instructions that cause programmable circuitry to at least:
    separate a data payload into at least first data and second data;
    cause first transmission of the first data to a target device over a first communication channel based on a first network protocol; and
    cause second transmission, at least partially in parallel with the first transmission, of the second data to the target device over a second communication channel based on a second network protocol, the first network protocol different from the second network protocol, the first network protocol and the second network protocol belonging to a same protocol layer.

11. The at least one storage device or storage disc of claim 10, wherein the first data includes a device identifier to identify the target device, and the instructions cause the programmable circuitry to record the device identifier on a blockchain.

12. The at least one storage device or storage disc of claim 10, wherein the instructions cause the programmable circuitry to add respective header data to the first data and the second data, the respective header data including at least one of first information associated with a transit time, second information associated with priority ordering, or third information associated with a retry policy.

13. The at least one storage device or storage disc of claim 10, wherein the instructions cause the programmable circuitry to cause the first transmission of the first data over the first communication channel and cause the second transmission of the second data over the second communication channel at least partially in parallel.

14. The at least one storage device or storage disc of claim 10, wherein the instructions cause the programmable circuitry to store data associated with the first communication channel and the second communication channel in a datastore, and test the first communication channel and the second communication channel to determine presence of connectivity at the first communication channel and the second communication channel.

15. The at least one storage device or storage disc of claim 10, wherein the instructions cause the programmable circuitry to store in a datastore data indicative of a first allowed data payload size for the first communication channel and a second allowed data payload size for the second communication channel.

16. The at least one storage device or storage disc of claim 10, wherein the instructions cause the programmable circuitry to store in a datastore data indicative of a first transmission speed for the first communication channel and a second transmission speed for the second communication channel.

17. A method comprising:
partitioning a data payload into at least a first portion and a second portion;
transmitting the first portion to a target device via a first communication channel, the transmitting of the first portion based on a first network protocol; and
transmitting the second portion to the target device over a second communication channel at least partially in parallel with the transmitting of the first portion, the transmitting of the second portion based on a second network protocol, the first network protocol different from the second network protocol.

18. The method of claim 17, wherein the data payload includes multi- modal data from one or more sources.

19. The method of claim 17, wherein the first communication channel is associated with a first network interface based on a first frequency and the second communication channel is associated with a second network interface based on a second frequency.

20. The method of claim 17, wherein the first portion includes a data payload type identifier to identify a type of data included in the first portion.

21. The method of claim 17, wherein the first portion includes a first sequence number and the second portion includes a second sequence number, and the method further including, at the target device:
identifying a first position of the first portion in a sequence for reassembly based on the first sequence number;
identifying a second position of the second portion in the sequence based on the second sequence number; and
reassembling the data payload based on an arrangement of the first portion in the first position and the second portion in the second position.

22. The method of claim 17, wherein the transmitting of the first portion is via a first network interface and the transmitting of the second portion is via a second network interface, and the first network interface is different from the second network interface.

23. The method of claim 17, wherein the transmitting of the first portion over the first communication channel and the transmitting of the second portion over the second communication channel is at least partially in parallel.

24. The method of claim 17, further including:
testing the first communication channel to determine whether connectivity is present; and
after a determination that connectivity is present at the first communication channel, storing data associated with the determination in a datastore.

25. The method of claim 17, further including:
storing first data indicative of a first allowed data payload size for the first communication channel and a second allowed data payload size for the second communication channel; and
storing second data indicative of a first transmission speed for the first communication channel and a second transmission speed for the second communication channel.

* * * * *